US009135955B2

(12) United States Patent  
Abecassis

(10) Patent No.: US 9,135,955 B2  
(45) Date of Patent: Sep. 15, 2015

(54) PLAYING A VIDEO PRESENTATION WITH PLAYBACK FUNCTIONS

(71) Applicant: Max Abecassis, Boca Raton, FL (US)

(72) Inventor: Max Abecassis, Boca Raton, FL (US)

( * ) Notice: Subject to any disclaimer, the term of this patent is extended or adjusted under 35 U.S.C. 154(b) by 108 days.

(21) Appl. No.: 13/964,176

(22) Filed: Aug. 12, 2013

(65) Prior Publication Data

US 2013/0343721 A1 Dec. 26, 2013

Related U.S. Application Data

(63) Continuation-in-part of application No. 13/506,093, filed on Mar. 26, 2012.

(51) Int. Cl.

| | |
|---|---|
| *H04N 5/92* | (2006.01) |
| *G11B 27/10* | (2006.01) |
| *H04N 9/87* | (2006.01) |
| *H04N 9/80* | (2006.01) |
| *H04N 5/445* | (2011.01) |
| *H04N 5/76* | (2006.01) |
| *H04N 9/82* | (2006.01) |
| *H04N 21/482* | (2011.01) |
| *H04N 21/81* | (2011.01) |
| *H04N 21/84* | (2011.01) |
| *H04N 21/845* | (2011.01) |
| *H04N 21/8549* | (2011.01) |
| *H04N 21/858* | (2011.01) |
| *G11B 27/00* | (2006.01) |

(Continued)

(52) U.S. Cl.
CPC .............. *G11B 27/10* (2013.01); *G11B 27/005* (2013.01); *G11B 27/105* (2013.01); *G11B 27/11* (2013.01); *H04N 5/445* (2013.01); *H04N 5/76* (2013.01); *H04N 9/80* (2013.01); *H04N 9/8205* (2013.01); *H04N 9/87* (2013.01); *H04N 21/4307* (2013.01); *H04N 21/4622* (2013.01); *H04N 21/4722* (2013.01); *H04N 21/4828* (2013.01); *H04N 21/8133* (2013.01); *H04N 21/84* (2013.01); *H04N 21/8456* (2013.01); *H04N 21/8549* (2013.01); *H04N 21/8586* (2013.01); *H04N 5/783* (2013.01); *H04N 21/4221* (2013.01); *H04N 21/42208* (2013.01); *H04N 21/42222* (2013.01); *H04N 21/47217* (2013.01); *H04N 21/47815* (2013.01)

(58) Field of Classification Search
CPC .......... H04N 21/4222; H04N 21/4221; H04N 21/47217  
USPC ....................................................... 386/241  
See application file for complete search history.

(56) References Cited

U.S. PATENT DOCUMENTS

| | | |
|---|---|---|
| 5,434,678 A | 7/1995 | Abecassis |
| 5,596,705 A | 1/1997 | Reimer et al. |

(Continued)

*Primary Examiner* — William Tran

(57) ABSTRACT

A video map comprising a first plurality of segment definitions defining video segments within a video, the defining being responsive to at least one presentation of the video less in length than the length of the video; a first segment definition that defines a first video segment within the video and is associated with an actual identity of a locale depicted within the first video segment, the actual identity of the locale being different than a locale identity as represented in the video; a second segment definition that defines a second video segment within the video and is associated with an identification of a cinematic technique depicted within the second video segment; and a third segment definition that defines a third video segment within the video and is associated with an explanation of a depiction within the third video segment.

20 Claims, 12 Drawing Sheets

(51) Int. Cl.
  *H04N 21/43*     (2011.01)
  *H04N 21/462*    (2011.01)
  *H04N 21/4722*   (2011.01)
  *G11B 27/11*     (2006.01)
  H04N 5/783       (2006.01)
  H04N 21/478      (2011.01)
  H04N 21/422      (2011.01)
  H04N 21/472      (2011.01)

(56) References Cited

U.S. PATENT DOCUMENTS

| | | |
|---|---|---|
| 5,737,479 A | 4/1998 | Fujinami |
| 5,778,135 A | 7/1998 | Ottesen et al. |
| 5,809,471 A | 9/1998 | Brodsky |
| 6,192,340 B1 | 2/2001 | Abecassis |
| 6,208,805 B1 | 3/2001 | Abecassis |
| 6,263,505 B1 | 7/2001 | Walker et al. |
| 6,317,795 B1 | 11/2001 | Malkin et al. |
| 6,408,128 B1 | 6/2002 | Abecassis |
| 6,504,990 B1 | 1/2003 | Abecassis |
| 6,553,178 B2 | 4/2003 | Abecassis |
| 6,577,346 B1 | 6/2003 | Perlman |
| 6,889,383 B1 | 5/2005 | Jarman |
| 7,975,021 B2 | 7/2011 | Jarman et al. |
| 8,117,282 B2 | 2/2012 | Jarman et al. |
| 8,150,165 B2 | 4/2012 | Melikian |
| 8,374,387 B2 | 2/2013 | Lienhart et al. |
| 8,402,500 B2 | 3/2013 | Walker et al. |
| 8,494,346 B2 | 7/2013 | Abecassis |
| 8,645,991 B2 | 2/2014 | McIntire et al. |
| 2004/0196570 A1* | 10/2004 | Nurishi .................. 359/668 |
| 2007/0250901 A1* | 10/2007 | McIntire et al. .......... 725/146 |
| 2013/0151534 A1* | 6/2013 | Luks et al. ............... 707/742 |

* cited by examiner

PLAYING A VIDEO PRESENTATION WITH PLAYBACK FUNCTIONS

RELATED U.S. APPLICATION DATA

This application is a continuation-in-part of patent application Ser. No. 13/506,093, filed Mar. 26, 2012, and this application is related to patent application Ser. Nos. 13/506,099; 13/953,929; 13/954,110; 13/955,085; 13/956,951, and 13/957,014 which are hereby incorporated by reference.

BACKGROUND OF THE INVENTION

1. Field of the Invention

Systems for, and methods of, providing, a user, during a playing of a video, information identifying the locale that is depicted in a video; explaining the plot or subplot significance of a scene or clip in the video; identifying the cinematic techniques utilized in a shot or clip; and providing information relating to a noteworthy item depicted in the video. The source of the information is provided by a map of the video. The map of the video may be provided by the source that provides the video or by a source other than the source that provides the video. A source of the video may be a hard format such as a DVD or Blu-ray disc, or a soft format that is broadcasted, narrow-casted, delivered on-demand, streamed, and/or downloaded by a variety of means such as over-the-air broadcast, cable, satellite, cellular, internet, and any other means of receiving content/data. The means for playing the video comprises any device capable of playing video such as, for example, an optical disc player, a personal computer, a set box, a multimedia player, gaming device, and/or smartphone.

2. Description of the Related Art

DVD-Videos released by the major motion picture studios conventionally store a full length motion picture encoded using the H.262/MPEG-2 Part 2 video technologies. DVDs generally provide scene selection and subtitles and/or closed captioning in a plurality of languages. Among other features, some DVDs include multiple camera angles for a scene, and the capability to play one of a plurality of different content versions (e.g. a director's cut or unrated version and an "R" rated versions). DVD capable devices, such as a DVD player, or a computer DVD drive with a software DVD player, require a DVD drive and a MPEG decoder. Such DVD devices provide for, among other features, fast-forward, fast-rewind, skip-forward or skip-backwards by chapters, turn on/off subtitles, subtitle and audio language selection, camera angle selection, and menu navigation to select, for example, multiple content versions.

While DVDs and Blu-rays provide many capabilities and functions exceeding those provided by, for example, conventional linear playback formats, optical disc playback devices do not provide, during the playing of a motion picture, information (e.g., a locale depicted within the video) that is readily accessible by a user. Such deficiencies are not addressed by, for example, the many sources that provide information, including the beginning and ending credits in a video, supplementary features and commentaries included with the motion picture, information in optical disc packaging, video listings, and a great variety of web sites, or the various sources that may provide information about a video. The rare inclusion in the video itself of information (e.g., the identification of a locale) fails to provide systematized information (e.g., an identification of the many locales depicted within the video) and access to related locale information.

BRIEF SUMMARY OF THE INVENTIONS

The present inventions relate generally to system and methods for providing a user, during a playing of a video, information identifying the locale that is depicted in a video; explaining the plot or subplot significance of a scene or clip in the video; explaining the cinematic techniques utilized in shot or clip; and providing information relating to a noteworthy item depicted in the video. By contrast to the usual passive viewing of a video, or the interactive playing of a video, as in the playing of a computer game, a primary element of the "autoactive" systems and methodologies disclosed is the synergistic integration of a map of the content of the video with the playing of the video to satisfy the real-time informational interests of a user and to deliver a more informed video viewing experience.

Accordingly, it is an object of the present inventions to provide, during a playing of a video or a presentation of a video, with efficient access to information that identifies a locale that is depicted within a video, explains the plot or subplot significance of a scene or clip in the video; explains the cinematic techniques utilized in shot or clip; and provides information relating to a noteworthy item depicted in the video.

It is also an object of the present inventions to provide, during a playing of a video or a presentation of the video, an indication that information is available at the currently depicted location within the video.

It is also an object to link the information with other content or information available from within the video, provided with the video, and/or available from a source external to the video.

It is also an object to provide information distinguishing between the actual locale and the portrayed locale depicted within the video.

It is also an object to provide a linkage to an external map identifying the geographical location of the locale depicted in the video.

It is also an object to provide for an appropriately labeled key on a remote control device for efficient access to information.

It is also an object to provide for an appropriately systemized verbal set of command for efficient access to information.

Briefly, these and other objects are accomplished by autoactive capabilities and functions provided by systems comprising, and methodologies utilizing processing, random accessing, and control software functions, integrated with information.

In one of a number of embodiments, a video is first analyzed to define segments or identify video frames within the video responsive to the depiction of a significant or noteworthy item. Segments or individual video frames are associated with a descriptor relating to the depiction of an item. Each of the items is associated with an image of the item as depicted in the video, and may be associated with an image of the item as the item may appear in a promotional photograph. During playback of the video or a presentation of the video, when a user desires to obtain information of the item depicted in any particular segment of the video, the user activates a dedicated "Who", "Where", "Why", "How" or "Info" function that enables the display of information responsive to the activated function, the map of the video, and the location within the video. The software routines supporting each of functions identify the current location in the video, query a database to find a definition or identification responsive to the current location, retrieve information together with a picture to enable visual identification by the user. Further, linkages are provided to external sources of information relating to the item. For example, in the case of a Where function, the linkage enables an identification of the locale in a geographical map.

These and other embodiments, features, advantages, and objects, are apparent in the context of the detailed description, accompanying drawings, and appended claims that follow.

BRIEF DESCRIPTION OF THE DRAWINGS

The following drawing figures, that form a part of this application, are illustrative of embodiments of the present invention and are not meant to limit the scope of the invention in any manner.

DETAILED DESCRIPTION OF THE INVENTIONS

Figure 1A:
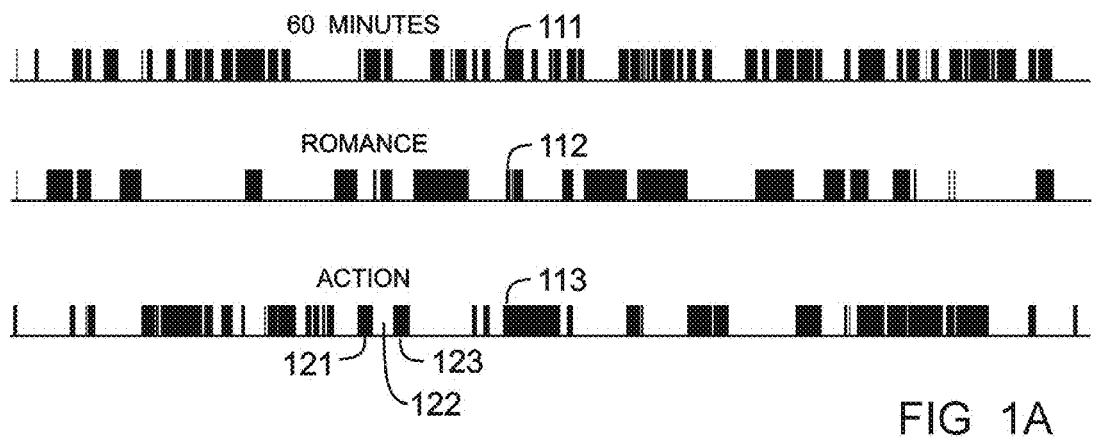
FIG. 1A graphically illustrates a number of presentations of a movie defined by the video map.

U.S. Pat. Nos. 5,434,678; 5,737,479; 5,778,135; 6,192,340; 6,208,805; 6,317,795; 6,408,128; 6,504,990; 6,553,178; 6,889,383; 7,975,021; 8,117,282; 8,494,346; and their respective divisions are hereby incorporated by reference. Where subject matter described directly in this specification differs from subject matter described in an incorporated reference, the subject matter described directly herein should be considered in the context of the embodiments disclosed herein. The incorporated subject matter may be considered in the context of alternative embodiments. Further, the selective direct inclusion herein of portions of the incorporated references should not be interpreted as an indication of lack of materiality of the non-directly included portions.

For purposes of the present disclosure, various terms used in the art are defined as follows:

The term "herein" shall mean in the entirety of this specification including drawings, abstract, and claims. The term herein does not limit to the paragraph or section in which it may appear.

The terms "include", "comprise", and "contains" do not limit the elements to those listed. By contrast, only the term "consist" limits the elements to those listed.

The terms "application software", "software application", "application", "app", and "computer software" shall mean all the executable, libraries, scripts, instructions, and/or steps in any format that causes, or is required by, a device to perform a task, function, or process. Application software comprises a computer program designed to assist a user to perform task, function, process, or activity. In some instances application software and operating system software may be a synergistically integrated and indivisible.

The term "associate" shall mean assign, give, allocate, associate, designate, ascribe, attribute, link, and/or relate.

The term "chapter" shall mean a division of a video generally defined by the author of the video. Optical discs, for example, typically have multiple chapters such as with DVDs, which often refer to a chapter as a scene.

The term "clip" shall mean a segment that is smaller than a chapter and usually smaller than a scene. A clip includes one or more contiguous shots, and usually depicts the same primary characters within a location. A clip's definition is responsive to a material change in the participation of the principal characters, a material change in location, and/or a distinct change in thematic content or topic of conversation.

The term "content-on-demand system" shall mean a video-on-demand system that is responsive to a user's content preferences. A content-on-demand system not only permits a user to obtain a specific video(s) or segment(s) of videos in response to the user's programming preferences, a content-on-demand system also permits the user to receive a version of the video(s) or segment(s) of videos that are responsive to the user's other types of content preferences. A content-on-demand system and the delivery of variable content video services as described herein may utilize a variety of types of hardware and network infrastructure and are not limited to any particular hardware or network infrastructure that may be employed in a given implementation.

The term "descriptor" shall mean a keyword, word, term, code, phrase, designations, write-ups, and linkages. The term descriptor shall also mean any data, information, image, and/or video frame that identifies, describes, links, and/or categorizes content of a video, portions of a video, or a video frame. A linkage is any information, data, and/or method that enables retrieving and/or downloading data from a local/internal and/or a remote/external source.

The term "dialog" shall mean a dialog, conversation, monologue, lyric, utterance, and/or communication. Dialog also comprises information that may be included in the subtitles or the closed captioning.

The term "DVD" shall mean a digitally encoded motion picture readable from an optical disc. A DVD comprises, for example, an optical disc storing a full length motion picture encoded using the H.262/MPEG-2 Part 2 video compression technology; an optical disc in compliance with the "DVD Specifications for Read-Only Disc/Part 3. Video Specifications" available from Toshiba Corporation; and a DVD-Video.

The term "geographic map" shall mean any map, including satellite, topographical, street, and such maps as Google Maps, Google Earth, Google Earth View, Google Street View, OpenStreetMap, and whether 2D or 3D, static or dynamic and interactive, single or multi-featured, and representative or photorealistic. The term "geographic map" shall also mean any depiction (e.g., map) that provides context for a locale.

The term "item" shall mean: (i) an object, article, artifact, instrument, device, and product; (ii) a specific act or action within an activity, process, event, and operation; (iii) an emotion, expression, gesture, and movement; (iv) an effect, consequence, and result; (v) a sound, occasional foreign language, and melodic content; (vi) a portion of a dialog, line, and linguistic expression; (vii) cinematography, cinematographic technique, cinematographic effect, a special effect, technical transition, and production error; (viii) a cameo or special appearance; and (ix) a locale.

The term "keywords" shall mean words, terms, phrases, designations, codes, descriptors, labels, data, metadata, and numbers.

The term "keywording" shall mean associating keywords.

The term "locale" shall mean a locale, location, site, setting, place, area, spot, landmark, location of interest, tourist attraction, building, building exterior, building interior, structure, and a geographically identifiable point. A locale is generally a location or place outside of the movie studio that is used for filming a movie or portion of a movie. A locale may be depicted as the actual locale or may be represented in the depictions as a locale other than the actual locale. The term "locale" is differentiated from the term "location" when the term location refers to a point in the timeline of the video.

The term "MPEG" shall mean a digital compression/decompression technology. MPEG comprises, for example, a H.262/MPEG-2 Part 2 video compression/decompression technology.

The term "navigation point" shall mean a navigation pack, NV_PCK, VOBU, GOP, I-frame, and/or any address, location, or point, in a video, that a navigator is capable of seeking to.

The term "navigator" shall mean application software and/or operating system software that provide video playback capabilities, decoding, decrypting, and/or rendering, for playing a movie on a personal computer. A navigator comprises, for example, Microsoft's DVD Navigator, decoder filters, and renderer, to handle, for example, CSS and analog copy protection.

The term "network" shall mean any private or public, wired or wireless video communication system.

The term "noteworthy" in connection with content shall mean content that: (i) may be of interest to a significant audience; (ii) is noteworthy, remarkable, or compelling; and/or (iii) is uncommon, atypical, peculiar, unusual, unique, rare, or extraordinary.

The term "performer" shall mean an individual, participant, actor, or actress, appearing in a video and/or credited for the physical and/or the verbal performance of a character. A performer refers to, for example, an actor in a motion picture, an athlete in a televised sporting event, a newscaster in a news program, and a chef in a cooking show.

The terms "play" and "playing", as in play or playing a segment of a video, shall mean playing meaningfully, or substantially all or a portion of a segment. In other words, while a method or system disclosed herein may claim or intend to play the entirety of, or all, of a segment, a complete playing of a segment does not necessarily require the playing of every video frame, interlaced field, audio and sub picture portion, and/or bit of data of the segment.

The term "plot explanation" shall mean information, rationale, and/or explanation relating to, or relevant to understanding or appreciating, a plot, sub-plot, theme, storyline, principle, idea, key point, clue, and/or item in the movie.

The term "plot point" shall mean a plot, sub-plot, theme, storyline, principle, idea, key point, clue, and item.

The term "preferences" shall mean "programming preference", "version preference", "presentation preference", "content preferences", "function preferences", "technical preferences", and "playback preferences". The term "programming preference" shall mean a preference or preferences for a specific video (e.g. Spider-Man), genres of videos (e.g., Action), types of videos (e.g. interactive video detective games), series of videos (e.g., 007) broad subject matter of videos (e.g. mysteries), and/or time and date for playback of the video. The term "version preference" shall mean a preference or preferences for a version of a video (e.g., motion picture), released by the copyright owner (e.g., motion picture studio), that includes content not available in an alternate version of the video. The version of a video refers to, for example, the "Theatrical", "Unrated", and "Director's Cut" version options in a DVD-Video. The version of a video does not refer to sequels and/or remakes of a video such as Spider-Man (2002), Spider-Man 2 (2204) and The Amazing Spider-Man (2012). The term "presentation preference" shall mean a preference or preferences that cause the selective inclusion, in a presentation, of segments from within a video, from a version of a video, or from within a plurality of videos. The term "presentation preference" shall also mean a preference or preferences for any one of the plurality of features provided by each of the following: Presentations, Compilations, Subjects, Dilemmas, Best Of, Performers, Shopping, Music, Search, and Preview. The term "content preferences" shall mean preferences for the form of expression, explicitness, inclusion or exclusion of objectionable content, a level of explicitness in each of a plurality of content categories of possibly objectionable content, length, level of detail, type of thematic content, and/or depictions of potentially objectionable items and/or acts. The Control feature of the CustomPlay application provides for content preferences. The term "function preference" shall mean a preference or preferences for any one of the plurality of elements provided by, or associated with, a playback function (e.g., Who, What, Where, Why, How, and Info). The term "technical preference" shall mean a preference or preferences for the technical and/or artistic elements (e.g., dissolves, fades, and wipes) that may be implemented during the playing of non-sequential segments. The term "playback preference" shall mean a preference or preferences for visual and audio options (e.g., camera angles, picture with picture, subtitles, closed captioning, and commentaries) that may be available for a video.

The terms "seamless" and "seamlessly" shall mean without gaps perceptible to the human eye, achieved by maintaining a constant video transmission rate. A seamless playing of non-sequential segments (i.e., the skipping of a segment) while technically "seamless", may not appear artistically seamless to a user because a change in the content that is played, rather than how it is played, suggested that a skip of content took place.

The term "seek/step data" shall mean any index, data, and/or information that facilitates access to a video frame within a video and/or facilitates the utilization of a video map with a video. Seek/Step data need not include step data (e.g., data informing a frame advance). Seek/step data may, without the step data, directly address every video frame within a video. Further, for example, and not limitation, seek/step data need not be based on navigation points, synchronizing information (i.e., seek/step data) may be based on shot changes or scene changes in the video.

The term "search terms" shall mean terms, words, phrases, designations, codes, descriptors, labels, data, metadata, numbers, or other information that identifies, describes, or specifies what is being searched.

The terms "segment" and "video segment" shall mean one or more video frames.

The term "trailer" shall mean a trailer, preview, video clip, still image, and/or other content that precedes and/or is extraneous to the movie.

The term "user" is interchangeable with the terms "subscriber", "viewer", and "person", and shall mean an end-user person actively using video content, passively viewing a video, interactively playing a video game, retrieving video from a video provider, and/or actively subscribing to and using multimedia, internet, and/or communication services.

The term "variable content video" shall mean a video characterized by a nonlinear architecture facilitating a variety of possible logical sequences of segments. A variable content video comprises parallel, transitional, and/or overlapping segments to provide multiple versions of a video. Responsive to the particular embodiment implemented, a variable content video may also include a user interface, application software, software program routines, system control codes for controlling the playing of the video/audio, video map, bookmark generating data, seek/step data, and/or map synchronization data. A video that does require parallel, transitional, and/or overlapping segments to be variably played.

The terms "video", and "video program" are interchangeable and shall mean any video image regardless of the source, motion, or technology implemented. A video comprises images and audio found in full motion picture programs, films, movies, interactive electronic games, and video produced by multi-media systems. Video comprises still characters, graphics, images, motion pictures, films, and multimedia productions; full motion pictures and television programming; news, sports, cultural, entertainment, commercial, advertisements, instructional, and educational programming. Responsive to the particular embodiment implemented, a video may also comprise video, audio, sub picture information, and/or other information associated with the video, such as a user interface, application software, software program routines, system control codes for controlling the playing of the video/audio, video map, bookmark instructions, seek/step data, and/or map synchronization data. The term "movie" shall mean a video, and is generally utilized herein in those situations when the context references a video (e.g., a DVD-Video or Blu-ray Disc) that comprises other information (e.g., menus and trailers) and one or a plurality of videos (e.g., a rated version of a movie and an unrated version of the movie). Thus, for clarity, in those situations a video comprises a movie or a plurality of movies. A video such as a DVD-Video and a Blu-ray Disc generally store navigation data, menus, trailers, and, for example, a digitally compressed full length movie.

The terms "video map", "map", and "segment map", shall mean any combination, arrangement, table, database, listing, index, and/or information defining a beginning and ending of one or more segments; and/or any combination, arrangement, table, database, listing, index, and/or information identifying one or a plurality of individual video frames. A video map may further comprise: (i) at least one descriptor associated with at least one segment, a sequence of segments, or a video frame; (ii) at least one linkage associated with at least one segment, a sequence of segments, or a video frame; (iii) bookmark generating data; and/or (iv) seek/step data. A defining of a beginning and ending of a segment may be by, for example, directly identifying a beginning and by indirectly identifying an ending by defining the duration of the segment.

The term "video-on-demand system" shall mean any video delivery system that is responsive to a user's programming preferences, i.e. provides a user-selected video at a user-selected time. Video-on-demand comprises, for example, movies-on-demand, video dial tone, cellular video, and digital satellite systems that are responsive to a user's time and date preferences and that provide play control functionality in the viewing of a video.

Where not explicitly and unambiguously inconsistent with the specific context, the above defined terms and other terms defined herein are to be understood in the broadest sense. Even if a term defined herein may, in a particular context, be understood more narrowly, the term's broad meaning and scope shall not be limited thereby. A term that is not explicitly defined herein shall have its ordinary and customary meanings.

The teachings herein with respect to a video may be applied to, for example, any type or kind of content that may be captured in a video format, including motion pictures, movies, television programs, news programs, sports programs, educational videos, advertisements, informationals, commercials, and other videos that promote products and services. While a particular feature may be detailed with respect to a specified type of video, it is intended to apply the teachings herein broadly and harmoniously across all different types and classes of video, including, for example, and not by way of limitation, a variable content video and a variable content game.

The CustomPlay media player application utilizes a video map to enable extracting a range of presentations from within a movie or a plurality of movies. The CustomPlay application and video map exploit random access technologies to provide innovative presentations, special features, and playback functions. An embodiment of the CustomPlay application runs on a Windows PC and plays DVD-Videos released by the major motion picture studios. A full-featured video map identifies an average of over 2,000 segments within a full length motion picture. Each segment is assigned the necessary descriptors to support one or more of the eleven feature sets (Presentations, Compilations, Subjects, Dilemmas, Best Of, Performers, Shopping, Music, Search, Preview, and Control) and a range of playback functions (e.g., Who, Where, Why, How, and Info).

Presentation Features

The Presentations feature provides storyline driven depictions that are focused on a genre, theme, perspective, or idea within a video. Presentations include Action, ActionX, Romance, Comedy, and Intellectual. A Sixty Minutes presentation retains the story flow, principal characters, themes, and the most memorable water-cooler moments. A Perspective presentation places a viewer within the emotional framework of a character. A storyline driven presentations is generally longer than 40 minutes.

The Compilations feature provides clips from a video that share similar content or theme without being driven by the plot or story. The Action compilation of the movie Dredd plays all the graphic action scenes without plot or story to interrupt the violence. The comedy compilation of Ted plays a highlight reel of the hilarious vulgar comedy. An Intellectual compilation of Contact plays the religious and philosophical debate so they it can be discussed without viewing the film. The Conversation compilation of Bad Santa plays the hilarious and touching conversations between Thurman Merman and Santa. A compilation presentation averages 10-30 minutes.

The Subjects feature provides sets of segments that are intended to amuse, inform, or parody. Subjects include Action (the nonstop gunfire in Predator), Character Mannerisms (blinky Bella in Twilight), Comedy (Ted's rants in Ted), Dirty Talk (dialog shifted from innocent to naughty), Film Technique (lens flares in Star Trek), Hidden Items (oranges in The Godfather), and Movie in A Nutshell (a nutty parody of the movie). A subject presentation averages 1-3 minutes.

The Dilemmas feature provides some of the most intellectually stimulating clips in a movie to provoke taught and conversations. Dilemmas depict conflicts between two competing moral principles such as compassion, financial responsibility, obligation to employees, parental responsibility, pursuit of soul mate, and self-actualization. A dilemma presentation averages 30-120 seconds.

The Best Of feature provides access to a video's best lines (each one segment of 5-10 seconds), best performances (each one segment of 1-2 minutes), memorable moments (each one segment of 1-2 minutes), memorable character presentations (each a set of segments totaling 30-45 seconds), and romantic moments (each one segment of 2-3 minutes). The Best Of feature also identifies the best depiction in each category in each video. The Best line in The Godfather: Don Corleone muttering "I'm going to make him an offer he can't refuse". The Best Performance in On the Waterfront: Marlon Brandon when he proclaims that he could have been a contender. The Most Memorable Character in Pirates of the Caribbean: The Curse of the Black Pearl: Captain Jack Sparrow's boorish mannerisms and swagger. The Most Romantic Moment in Casablanca: The moment when Rick responds "We'll always have Paris". The Most Memorable Moment in The Matrix: Neo appearing to bend time while narrowly dodging bullets on the rooftop of a downtown high-rise. The Performers feature supplements the Best Of feature and provides, for a principal performer, the retrieval of all the performer's clips (each clip 30-60 seconds, best lines, best performances, an intimate close-up presentation (each presentation 30-45 seconds), and memorable character presentation.

The Shopping feature provides links of an item or location depicted in video to a website that can provide additional information and/or the opportunity to purchase the item or obtain the service. The Shopping feature may be accessed during video playback, or through the Shopping catalog which provides 15-40 seconds presentations for a depicted product or service. Examples of featured Shopping items and services include: a life size statue of the T-800 statue from Terminator, the Algerian Love Knot necklace from Casino Royale, Arthur's leather jacket from Inception, and a James Bond bungee jump experience from Golden Eye. The Shopping feature links a musical item depicted in the video to a website that can provide additional information and/or purchase the musical item. Music may be accessed during movie playback, or through its own catalog of 30-90 sec. presentations.

The Search feature provides keyword searching for, for example, items, actions, performers, characters, film technique, production mistake, locations, and best lines" and retrieving segments, clips and scenes comprising the searched depiction. A Search segment is 5-10 seconds, a clip is 30-60 seconds, and a scene is 2-5 minutes. Examples of keyword searches include: "Trinity Ducati 996" in The Matrix; "Spider-Man kiss MJ" in Spider-Man; "cinematic wipes" in Star Wars; "Brooklyn Decker CPx cleavage" in Battleship; and "bloody horse head" in The Godfather. The Search feature is the most capable in an embodiment that enables simultaneously searching a videobase, e.g. the 007 movie series.

The Control feature enables the customization of a presentation according to a user's preferences for the level of explicitness (e.g., None, Mild, Explicit, and Graphic) in each of fourteen categories of possibly objectionable content (e.g., Bigotry, Blasphemy, Bodily Functions, Dishonor Flag, Dishonor Parent, Gore, Hideous, Mature, Nudity, Sex, Substance Abuse, Violence, Violence to Animals, and Vulgarity). The Control feature enables the exclusion of possibly objectionable content.

The Preview feature, by contrast to the Control feature, provides a user the capability to selective retrieve the possibly objectionable content by a level of explicitness for each of the fourteen categories of possibly objectionable content. Preview provides an efficient access to content to, for example, enable an informed decision when adjusting the objectionable content preferences.

FIG. 1A graphically illustrates a number of presentations of a movie defined by the video map for the motion picture Spider-Man. Depicted in black blocks 121 123 are the segments included in a presentation. The space in between black blocks 122 is content that is excluded (i.e., skipped) from the presentation. The various presentations are 60 Minutes 111, Romance 112, and Action 113. The user is also provided the option to play the Theatrical version 101 and a Custom presentation. The illustration depicts the substantial number of skips in the retrieval of non-sequential segments that are required to play a presentation. Two segments are deemed to be non-sequential segments when their playback requires a skip of a segment. In other words, two segments are deemed to be non-sequential segments when the linear playback of consecutive segments is discontinued by a skip of a segment. In the Action presentation 113 of FIG. 1A, segment 123 is intended to be played immediately after segment 121 is played, with the segment in between 122 being seamlessly skipped. Thus, segments 121 and 123 are an example of one type of non-sequential segments. As in the case of when a segment is "grafted" from another point in the movie, a playlist of non-sequential segments need not be played in the order of the begin frame timecode. In other words, another type of non-sequential segments is where a segment that is played has a begin frame timecode that precedes the end frame timecode of the prior played segment.

Figure 1B:
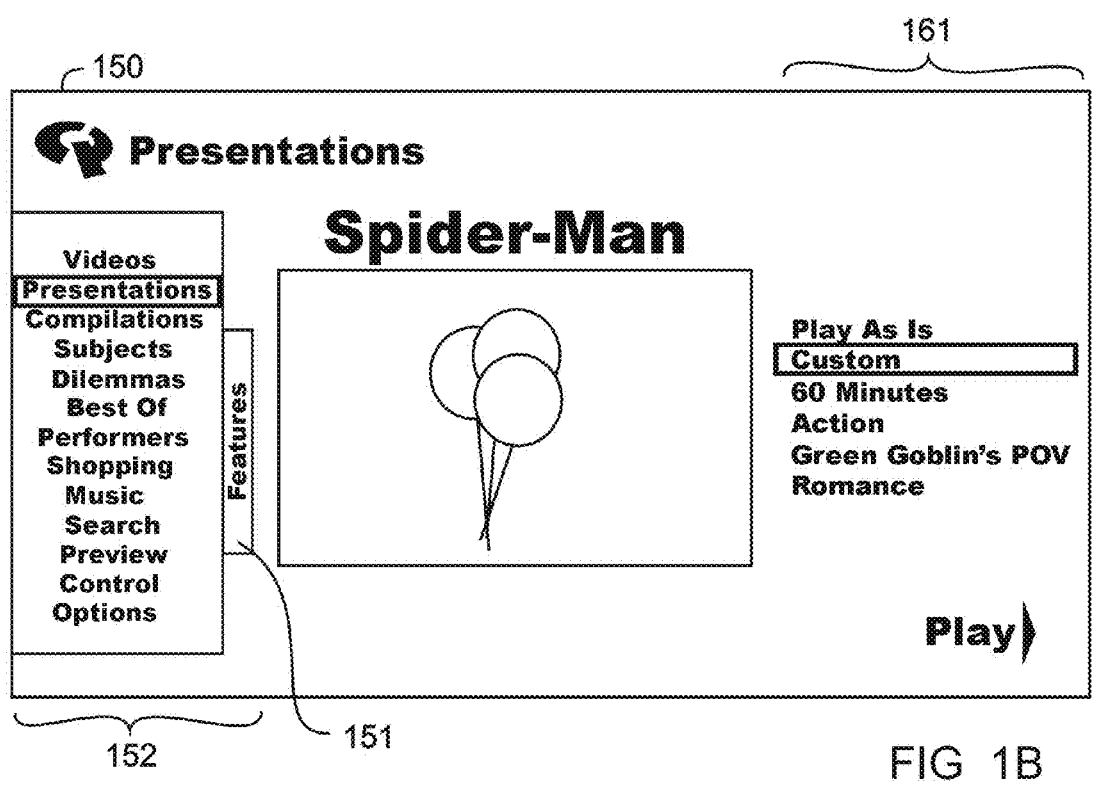
FIG. 1B graphically illustrates a feature selection screen for the presentations set of features.

FIG. 1B graphically illustrates a feature selection screen for the Presentations set of features. The Presentations selection screen 150 is accessed by the Features tab 151 in the application's UI. The features tab 151 displays a features menu 152 listing, and providing access to, the primary functions, feature sets, and options of the application. The features menu 152 lists the application feature sets comprising Presentations, Compilations, Subjects, Dilemmas, Best Of, Performers, Shopping, Music, Search, Preview, and Control. The features menu 152 also provides access to video selection functions (Videos) and user options and settings (Options).

In the case of the motion picture Spider-Man, the Presentation set of features 161 include the options for a user to play: (i) the movie as is (Play As Is); (ii) a Custom presentation of the movie that is customized according to the user's content preferences; (iii) a 60 Minutes presentation comprising the principal plot and noteworthy elements; (iv) an Action presentation that focuses on the action elements and substantially excludes the romance and family plot elements; (v) a presentation from the perspective of the Green Goblin; and (vi) a Romance presentation that minimizes the action and focuses on the romance.

Upon a user selecting a presentation, the user's presentation preference is applied to the video map to generate a playlist of segments that is consistent with user's presentation preference. For example, if the user selects an Action presentation 113 FIG. 1A from the Presentation features, the selection of segments for playback would be materially the opposite of those that would be selected for the Romance presentation 112 FIG. 1A.

Figure 2:
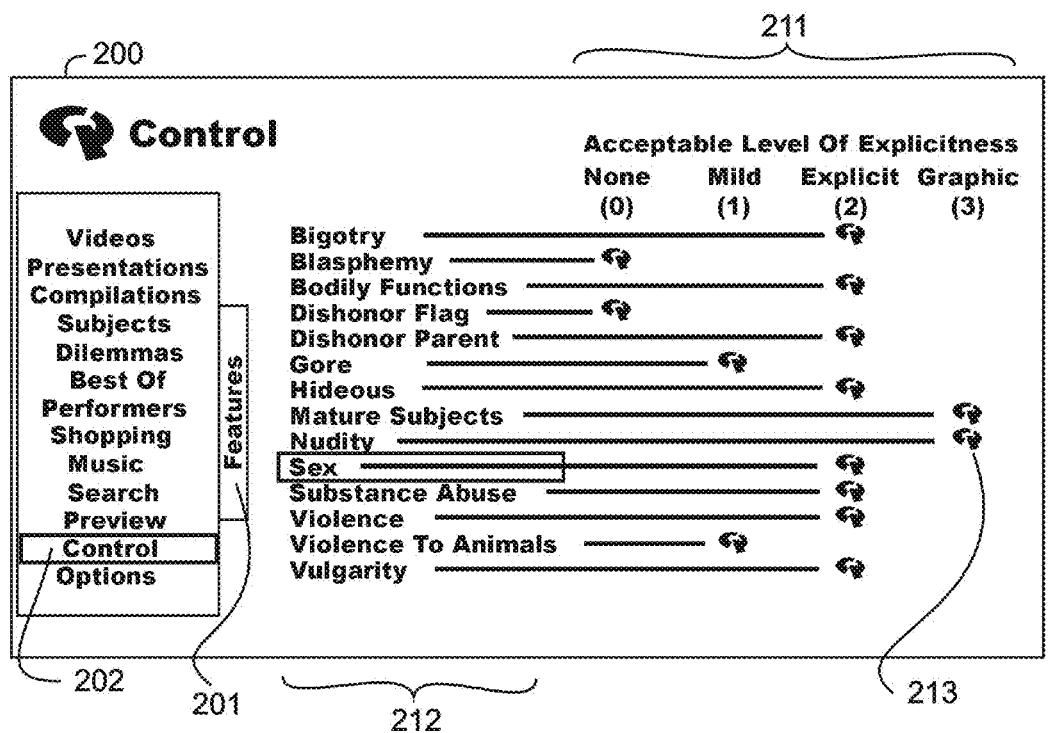
FIG. 2 graphically illustrates a content preference screen that enables a user to establish content preferences.

FIG. 2 graphically illustrates a content preference screen that enables a user to establish content preferences. The Control selection screen 200 is accessed by the Features tab 201 in the application's UI. The Control feature 202 enables a user to establish content preferences for the level of explicitness (i.e., None, Mild, Explicit, or Graphic) 211 in each of fourteen categories of possible objectionable content (i.e., Bigotry, Blasphemy, Bodily Functions, Dishonor Flag, Dishonor Parent, Gore, Hideous, Mature Subjects, Nudity, Sex, Substance Abuse, Violence, Violence to Animals, and Vulgarity) 212. In this particular screen UI, users indicate their selections by using the player's remote control unit, and pressing the UP and Down keys to select a category, and by pressing the number 0 key for None, a number 1 key for Mild, a number key 2 for Explicit, and a number 3 key for Graphic. In the example illustrated in FIG. 2, depicted with the CP logo 213 are the user specific content preferences for each category. The user in this case has elected to omit depictions of blasphemy during the playing of videos.

The application of a user's content preferences to the video map results in the automated logical selection of sequential and non-sequential segments of the selected video that are consistent with the user's content preferences. Any segment, with a content coding higher (abstract) than the user-selected content preference for the corresponding category would not be included in the video produced for the user. The segment selected for viewing would satisfy the presentation preference and would have a coding level equal to or lower than the user specified content preference for that category. If, for example, a user selects the 60 Minutes presentation and also request that the user's content preferences for the level of explicitness in each of fourteen categories be applied to that presentation, then the resulting "Custom 60 Minutes" presentation may be reduced to 45 minutes.

A viewer may pre-establish content preferences prior to playing any video, prior to playing a specific video, and modify the content preferences during a playing of the video with the new content preferences being applied as the playing of the video resumes or continues. Advantageously, video specific content preferences will display only the options for which content is actually present in the video. For example, if the video does not contain any depictions of Gore, the Acceptable Level Of Explicitness will be set at None irrespective of any generalized pre-established content preference.

Advantageously, a user may pre-establish different set of content preferences to be applied to the different features. For example, a user may prefer that the Presentations (e.g., Action and 60 Minutes) be responsive to the content preferences, but would prefer that no content preferences or limited content preferences be applied when the Search or Best Lines features are being utilized. Still further, a user may pre-establish different set of content preferences to be applied to the different genres of motion pictures. For example, the set of content preferences applied to a romance would be different than the set applied to an action movie. Still further, individualized set of content preferences may be established for each of a plurality of users in a household, be password protected, with supervisor limits set by category.

Playback Functions

The CustomPlay application advantageously utilizes the data in a video map that supports the various presentation features and other information to enable innovative video playback functions including the What function (U.S. Pat. Nos. 6,408,128 and 7,430,360) the Who function (U.S. Pat. No. 8,494,346), and the "In-Movie Shopping" function. The video playback functions are a specific type of feature that is usually enabled during video playback rather than in the selection of a presentation. The Who function, when enabled by the user prior to or during playback, utilizes performer and clip data to identify the performers and characters being depicted. The Who function also provides website links to additional information. The What function, when enabled by the user during playback, rewinds the video a user defined amount of time and continues playback with the subtitles temporarily enabled. The In-Movie Shopping feature, if enabled, displays a small icon in the bottom left corner of the screen when there is more information available for the currently displayed item, prop, or music. Alternatively, or additionally, the In-Movie Shopping function, if enabled, superimposes on the video an image and brief description of all the purchasable items depicted within the previous 30 seconds. The In-Movie Shopping function provides access to web pages where additional information is available.

The CustomPlay application advantageously utilizes video map data that is specifically created to support a range of innovative information and entertainment features/functions that are made available to, for example, a user during video playback. These functions include the Where function, the Why function, the How function, and the Info function. The Where function, when enabled by the user prior to or during playback, utilizes data to identify the locale being depicted and provides access via linkages to relevant locale information and geographical maps. The Why function provides, the user, access to plot information, rationale, or explanation. The How function provides, the user, access to cinematic technical information and explanation on how the scene, clip, or segment was created. The Info function provides information relating to noteworthy items being depicted. These information and entertainment functions are detailed further below.

It is noted that while certain exemplary embodiments are detailed, directly or by incorporation, for the What, Who, Where, Why, How, and Info playback functions, the inventions are not limited to the exemplary data elements utilized in any function. Many variations of the elements detailed among the playback functions are possible by way of permutation, combination, substitution, deletion, and/or additions in the specific data elements that are implemented (e.g., segment definitions, image and thumbnail identifiers, write-ups, linkages, and Search and Subject features). A video map addressing the various features and functions detailed herein provides a great database of additional information that may be mined to support the features, playback functions, and other capabilities.

Where Function

Data created for, or utilized by the Where function comprises, for example: a segment definition; an identity, as represented in the video, of a locale depicted within a video segment defined by the selected segment definition; an actual identity of the locale depicted within the video segment; a linkage, responsive to the actual identity, to a geographic map; a video frame identifier to provide a reference image and thumbnail; a write-up to provide brief in-video information; and a linkage to more detailed information. For example, in the motion picture The Dark Knight, the video map defines a segment by frames numbers 8797-8990 (23.976 frames per second) for a segment including the depiction of the exterior of the building represented in the movie to be the Gotham National Bank. The video map provides a locale identity as represented in the video, and an actual identity of the locale.

Represented As: Gotham National Bank
Actual Identity: Old Chicago Main Post Office
433 West Van Buren
Chicago, Ill. 60607

The video map for the Where function also includes the following write-up: "Gotham National Bank is, in reality, the Old Chicago Main Post Office. An addition was built on to the bank for this segment in which the bus pulls away from a demolished wall it had crashed through earlier in the movie. As the bus makes its getaway, it is seen driving down West Van Buren Street in Chicago. The Old Chicago Main Post Office also appears in Batman Begins and Transformers: Dark of the Moon." The write-up also supports the Info function and provides in-video information.

The video map for the motion picture The Dark Knight also includes an identification of video frame number, i.e., 8989, that is associated with the segment definition to provide a reference image and thumbnail for the locale. The video map also associates the following information links with the depiction of the building:

http://en.wikipedia.org/wiki/Old_Chicago_Main_Post_Office http://www.movie-locations.com/movies/d/DarkKnight.html#.Uf-njlFunmE The video map associates the following Google map link with the segment:

---
https://maps.google.com/maps?q=Old+Chicago+Main+Post+Office,+433+W.+Van+Buren,+Chicago,+IL&oe=utf-8&client=firefox-a&ie=UTF-8&ei=jLP_UYOVBY-A9QS4goCYBQ&ved=0CAoQ_AUoAg

---

Further, a video map may specify the type of geographic map to be utilized (e.g., a 3D map, satellite, street view) and the magnification level. Optionally the application utilizes a user's pre-established geographic map display and magnification preferences. Alternatively, the type of map utilized and magnification are responsive to the particular item being depicted. Still further, as indicated, previously, video map data created for a feature may also support a function. For example, the data created for a locale item for the Shopping feature may also be accessed by the Where function. Further, a video map may associate the locale with, for example, a Subject presentation, i.e., segments within the video relating to the locale are played. In, for example, the motion picture The Ninth Gate, the Chateau de Puivert is the subject of the following noteworthy segments: (i) post card photo at 01:54:19-01:54:22; (ii) exterior shots: 01:55:41-01:55:53, 01:55:58-01:56:20; (iii) exterior shots (on fire): 02:04:21-02:04:24; and final exterior shot: 02:08:30-02:08:48. (Begin and end video frame identifiers are approximate and in a HH:MM:SS format.) The playback of the set of segments may be provided to a user in, for example, a small window superimposed on the paused video playback, on a window to a side of the video, and/or full screen.

Additionally, the keywords supporting the Search feature and that are associated with the segment are available for display and complementary search functions. The following keyword strings are associated with the segment depicting the Gotham National Bank:

---
Joker.vehicle.bus.school.1994.International.3800.getaway.-District.22.yellow(escape.join.blend.enter.get)away.between.-behind.in.into.out.of traffic.convoy.vehicles.buses.school.yellow.line.other Gotham.City.street.road
building.bank.Gotham.National.exterior.outside

---

Figure 3A:
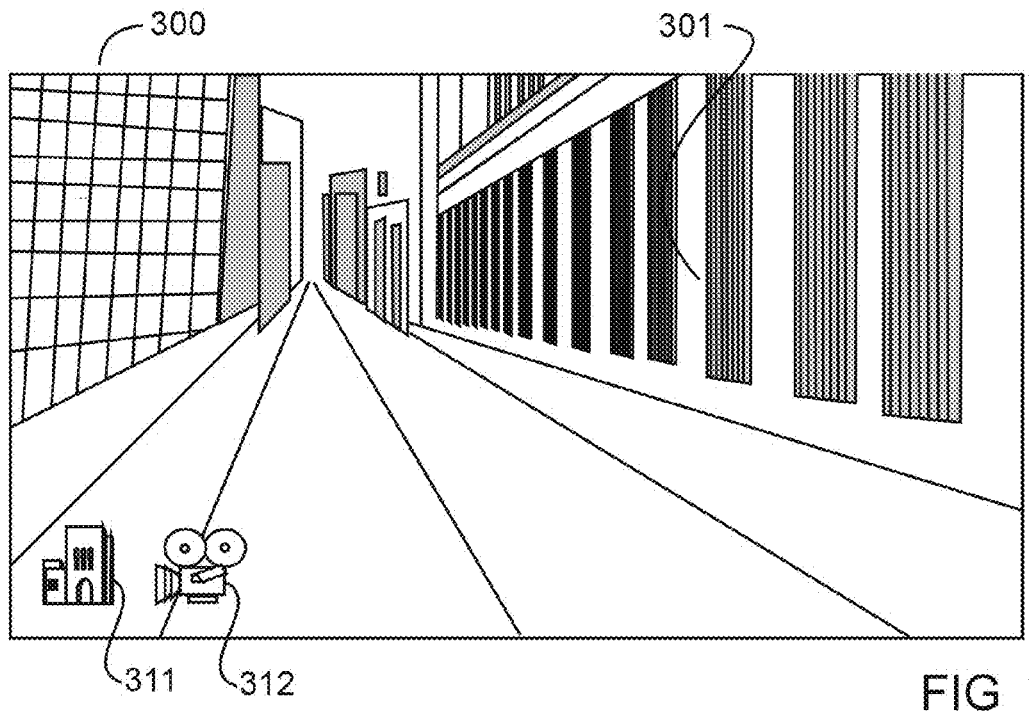
FIG. 3A is a representation of a video frame within a motion picture and the display of an indication that information is available for an item being depicted.

FIG. 3A is a representation of a video frame within a motion picture and the display of an indication that information is available for an item being depicted. The frame 300 of the video depicts a street and buildings 301. In this example multiple play function notification routines are simultaneously active. Thus, the current play location within a video is monitored and segment definitions are searched to identify a segment definition that is responsive to the play location and the active play function notification routines. In the instance that a segment definition is responsive, and during the period defined by the segment definition, an indication is provided that indicates that information is available for an item being depicted. The indication is be responsive to the particular function and may be provided by visual, audio, or tactile means. In the illustration of FIG. 3A, because a building being depicted 301 is associated with both a Where information and a How information, both a Where notification icon 311 and a How notification icon 314 are provided. In the case of the Where function, the indication is an icon of a building 311. In the case of the How function, the indication is an icon of a film camera 314. In this example, the indications 311 314 are superimposed in each frame of video during the period defined by the responsive segment. Alternatively, and especially when the segment definition identifies a single video frame, the indications 311 314 that information is available may be displayed for a pre-established amount of time preceding and/or following a video frame.

A segment definition that is responsive to the depiction of an item does not necessarily require that the item be depicted within each of the frames of the video segment defined by the segment definition. In certain situations, this would advantageously avoid a flashing display of the indication that item information is available. An embodiment that is based on segment definitions offers advantages over an embodiment based on a precise video frame specific identification. A segment based embodiment does not require the user to pause the playing of the video at a video frame depicting the item of interest since it is not dependent on the actual contemporaneous onscreen presence of that item. Nonetheless, precise video frame specific identification, as might be generated by image recognition methodologies, can provide, in an alternate embodiment, the source of item location information.

Different indications, e.g., icons are utilized for each of the different functions. An indication that item information is available for an item can take many forms, including, for example, text, actual images of the item, representations of the items, or anything visual, audio, or tactile that would signal to the user that information is available on an item being depicted. A smartphone application can take advantage of their tactile feedback capabilities (e.g. vibrations) to notify a user. A remote control devise may be similarly equipped to provide tactile notification. Alternatively or additionally, the item being depicted for which information is available may be highlighted by an outline, or highlighted by an area of increased brightness as if a spotlight was focused on the item. Such an embodiment may implement item frame coordinate and dimension information associated with a frame identifier.

A display of an indication that item information is available may be a generalized, categorized, individualized icon or other visual representation, or a picture of the actual item, extracted from within the video or external to the video. For example, a building icon may be displayed in connection with a Where function, while a movie camera may be utilized in connection with the How function. The indication that item information is available may be responsive to the images, descriptors, and linkages associated with the segment definition. A video segment comprises many different elements for which information may be provided. A balanced mix of Where, Why, How, and Info item notifications are less likely to overwhelm the user. Accordingly, a balanced mix between commercial and entertainment objectives is also desirable.

The same noteworthy item may appear in multiple different locations within a feature-length movie. In such a case multiple segment definitions are created, each responsive to the particular depiction of the item. Preferably, the selection of which of the particular depictions are selected for the creation of a corresponding segment definition is responsive to suitability and novelty of the depiction and other considerations associated with, for example, the noteworthiness of the item. Nonetheless, a user may not desire the displaying of an indication that item information is available for each of the depictions of that item for which a segment definition was created. Advantageously, a displaying of an indication that item information is available may be also responsive to a user pre-established indication display frequency. To accommodate such a user option, a segment definition may be further associated with a frequency determinant (e.g., primary, secondary, or numeric rank). A user desiring to limit the frequency that the displaying of an indication that item information is available would select the display of only primary depictions or depictions ranked highest (e.g., a "1" rather than a "2").

Figure 3B:
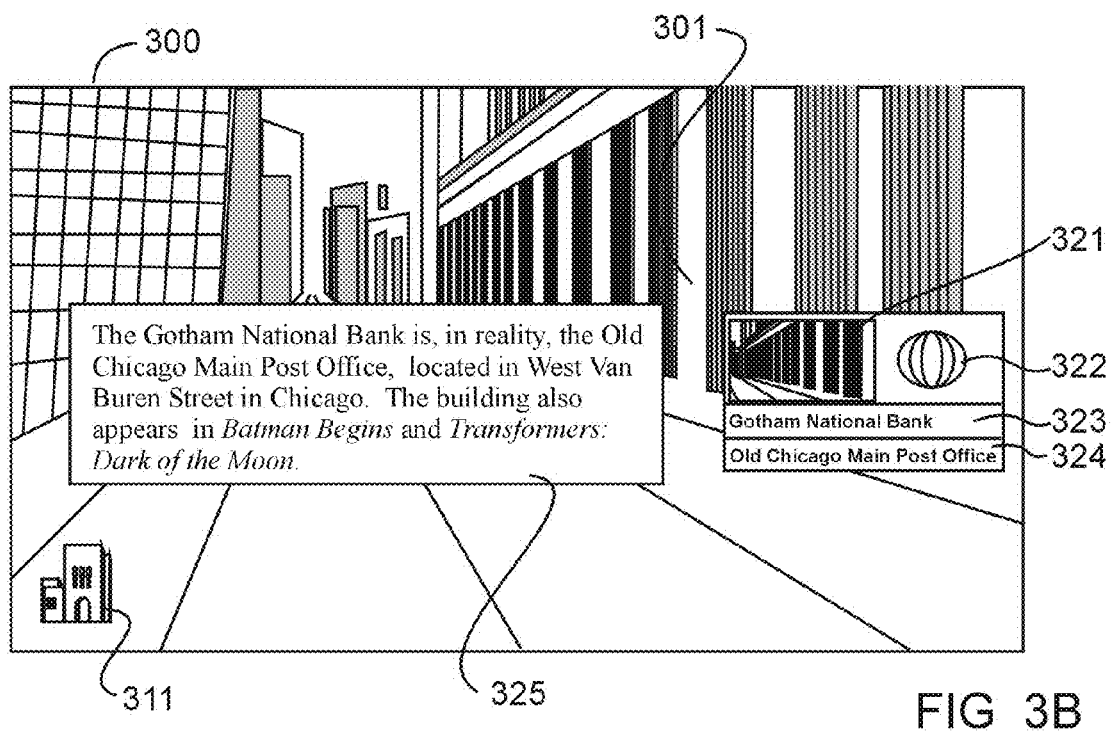
FIG. 3B is a representation of a video frame within a motion picture and the display of Where function information.

FIG. 3B is a representation of a video frame within a motion picture and the display of Where function information. In this illustration, following a user activation of the Where function, a current location in the video is identified that is responsive to the user activation. Responsive to the location in the video, item information is displayed. A location that is responsive to a user request for information need not be the precise location in the movie that was being played when a user requests item information. A location may be responsive to a user request for information even when it is principally or additionally responsive to, for example, segment definitions, decoding constrains, and/or player limitations.

In the illustration of FIG. 3B, the item information comprises an image of the locale 321, a globe icon 322, an identification of the depicted locale 323, and an identification of the actual locale 324. The image of the locale 321 helps distinguish among multiple locales that may be identified at this location, clip or period. Additionally, the image of the locale 321 enables the user to directly access, for example, a SUB presentation of the locale, a plurality of video segments from within the video depicting the locale, or a write-up 325. Optionally, as illustrated, the image of the locale 321 is focused on the portion of the video frame depicting the target locale. Alternatively, the image of the locale 321 is a video presentation of the locale rather than a single image. The globe icon 322 enables a user to automatically retrieve a geographical map locating the locale. Each of the identifications 323 324 enable the user to automatically retrieve, for example, corresponding website pages where additional information is available.

The particular elements that are implemented and/or displayed are responsive to the particular function (e.g., Who, Where, Why, How, and/or Info) enabled by the user and deemed advantageous to provide. A display of item information may provide a display of item information for a single item and, as the context may require, a display of item information for each of a plurality of items. A display of item information comprising the display of an image of the item extracted from within the video together with a textual identification of the item may be associated with additional information about the item.

Responsive to a user activating a playback function (e.g., Who, Where, Why, How, and/or Info), the display of item information may be as simple as an icon or more complex than illustrated in FIG. 3B. For example, clicking on an identifying image may toggle between a visual depiction that is extracted from within the video and, for example, a marketing image of the item. Advantageously, item information, as is for example illustrated with respect to FIG. 3B, serves as a means (e.g., clickable buttons) to enable the user to request additional item information relating to a displayed item information. An item information may constitute a button/object associated with a "clickable" event that when activated launches the additional information routines.

The illustration of FIG. 3B, presumes that the user has activated the item identification routines at that instant that the target item is on the screen. This need not be, and is often not, the case, especially where the user elects not to enable routines that monitor the depiction of certain items. A user may request item information for an item that was just depicted but is no longer currently depicted, whether or not an indication that item information is available was displayed. To accommodate those situations, different methodologies may be implemented to take into consideration a request location or a predetermined play period prior to the request location, and/or segment information. For example, the request location (e.g., a frame within the video) may be adjusted to include the request location and a predetermined play period prior to the request location, for example, 10 seconds. In this fashion, a segment definition is responsive to a request location if it is congruent with any portion of the period of time defined by the request location or a predetermined play period prior to the request location. Further, the display of identification information need not require the pausing of the playing of the video. The item identification routines may be continuously activated while video is playing and be responsive to an on/off toggle.

In one of many embodiments for providing information that identifies a locale depicted during the playing of the video, a method comprises the steps of: receiving from a user, during a playing of a video, a request for locale information; identifying, responsive to the request, a location in the video; retrieving a plurality of segment definitions; selecting, from the plurality of segment definitions, a segment definition that is responsive to the identified location, the selected segment definition is associated with (i) an actual identity of the locale depicted within the video segment, the actual identity of the locale being different than a locale identity as represented in the video; and (ii) a linkage to a geographic map; providing the actual identity of the locale depicted within the video segment; receiving from the user a request for a geographic map; and providing, responsive to the user request and the linkage, a geographic map of the locale.

In an alternate embodiment, a method comprises the steps of: receiving from a user, during a playing of a video, a request for locale information; identifying, responsive to the request, a location in the video; retrieving a plurality of segment definitions; selecting, from the plurality of segment definitions, a segment definition that is responsive to the identified location, the selected segment definition is associated with an actual identity of a locale depicted within a video segment defined by the selected segment definition, the actual identity of the locale being different than a locale identity as represented in the video; and providing, responsive to the user request and the actual identity of the locale, a geographic map of the locale.

In one embodiment, a video map comprises a segment definition that defines a video segment within a video; the segment definition is associated with an actual identity of a locale depicted within the video segment, the actual identity of the locale being different than a locale identity as represented in the video. Such a video map provides the necessary information to retrieve a geographic map that is responsive to the locale depicted within a video segment. An actual identity (e.g., actual address, other geographic identifier, or code) is utilized by a player's application to query, for example, a pre-established website to obtain a geographic map of the locale depicted within the video segment. It should be understood, that a video map comprising a plurality of segment definitions each defining a corresponding video segment within the video, and each video segment depicting a different locale falls within the scope of this embodiment. The specific language structure of the embodiment is chosen for clarity and not for limiting the scope of the invention to a single segment definition. A video map may comprise may elements including, for example, a write-up relating to the locale; and segment definition may be associated with many elements including, for example, responsive to the actual identity, a geographic map of the locale.

Why Function

Data created for, or utilized by, the Why function comprises, for example: a segment definition; a plot explanation for a plot point depicted within a segment of the movie; and a linkage to more detailed information. For example, in the motion picture Inception, a totem (e.g., a spinning top) plays a key function in understanding key principles in the movie. Advantageously, throughout the movie the Why function provides the user the opportunity to obtain explanations relating to the totem. A segment definition defining a video segment beginning at video frame 22707 and ending at video frame 23432, depicts a totem, and is associated with the following plot explanation: "In Inception, a totem is a small object, unique to each person, that a person must carry at all times in order to be able to distinguish dreams from reality. Cobb's Totem is a spinning top, unique because it belonged to his deceased wife Mallorie. Cobb knows the top will never topple over if he is still in a dream. It will only topple if he is in reality." Viewing a motion picture with the Why notification function enabled is particularly beneficial in a second viewing of an intellectually challenging motion pictures like Inception and the Matrix. A video map may associate the segment definition with a generalized additional information link (e.g., http://en.wikipedia.org/wiki/Inception_%28movie%29) or a plot specific additional information link (e.g., http://dharmafolk.org/2011/01/10/whats-your-inception-totem/)

Figure 3C:
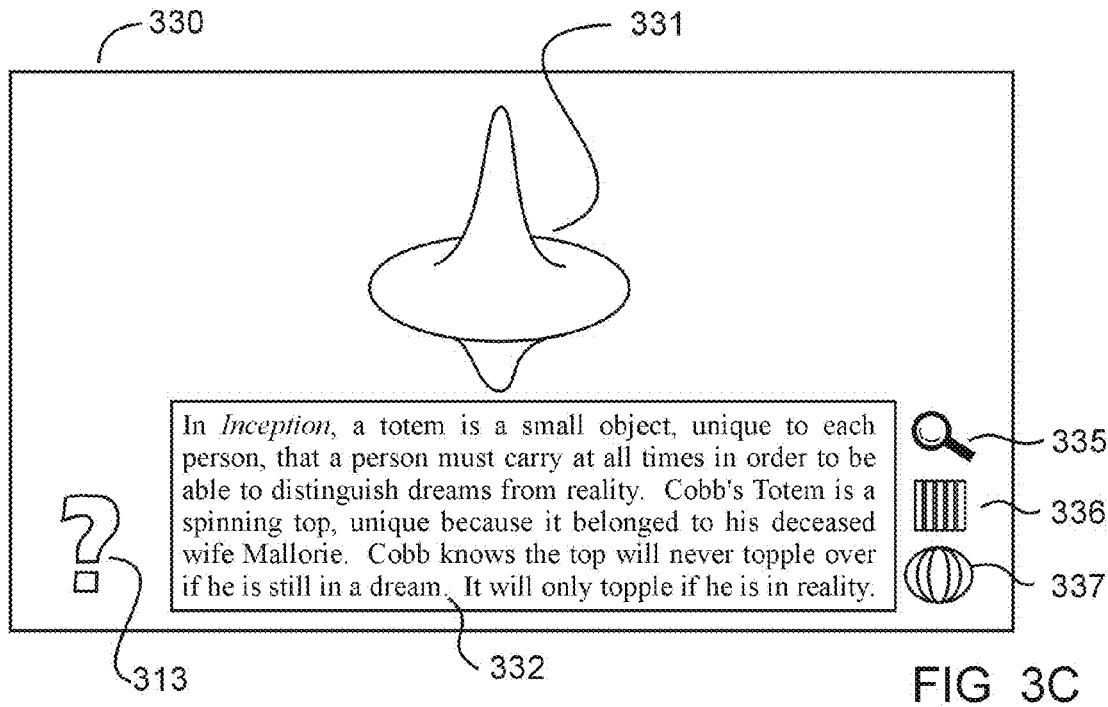
FIG. 3C is a representation of a video frame within a motion picture and the display of Why function information.

FIG. 3C is a representation of a video frame within a motion picture and the display of Why function information. In this illustration 330, following, or independent of, notification that plot explanation is available 313, a user's activation of the Why function and responsive to the location in the video, a context sensitive on-screen plot explanation is displayed 332 for the plot point relating to the spinning top 331.

Innovatively, taking advantage of the Search feature of the player application, the Why function also provides the user the capability to automatically search 335 for instances of the same plot point, and obtain progressively fuller plot explanations. Similarly, taken advantage of the SUB feature, the user is provided the means to play a presentation of the plurality of video segments within the video relating to the particular plot point (e.g., the totem) 336. Further, a linkage may be provided to external information or discussion on the topic 337. As illustrated in FIG. 3C, in a preferred embodiment each category of additional information (e.g., keyword search 335, SUB playback 336, link to dedicated location, and external link to third party websites 337) would have their own identifiers that may be recognized across the various features and functions of the player application.

The functions may take advantage of any additional video content (e.g., video/audio commentary, or supplementary video/audio content) that is supplied with or is available for the movie. In the case of additional video content that is supplied with the movie, the video map would, advantageously, map the video/audio segments from within the additional video content, and associate descriptors including synchronization data (e.g., references or linkages). A function would to utilize the synchronization data to provide additional information (e.g. additional video content) during playback of the movie.

In one of many embodiments for providing a plot explanation for a plot point depicted during the playing of the video, a method comprises the steps of: receiving from a user, during a playing of a video, a request for plot explanation; identifying, responsive to the request, a location in the video; retrieving a plurality of segment definitions; selecting, from the plurality of segment definitions, a segment definition that is responsive to the identified location, the selected segment definition is associated with: (i) a plot explanation for a plot point depicted within a video segment defined by the selected segment definition, (ii) a linkage that is responsive to the depicted plot point, and (iii) synchronization data to a video segment from within video content that is additional to the video and that is responsive to the depicted plot point; providing the plot explanation for the depicted plot point; receiving from the user a request for additional information relating to the depicted plot point; and providing, responsive to the user request, the linkage, and the synchronization data, additional information relating to the depicted plot point and the video segment from with the additional video content. Additional features are provided by, for example, the step of keyword searching a plurality of segment definitions each defining a video segment within the video; and selectively playing, from within the video, a plurality of video segments that are responsive to the depicted plot point.

In one embodiment, a video map comprises a segment definition that defines a video segment within a video, the segment definition is associated with (i) a plot explanation for a plot point depicted within a video segment defined by the segment definition; (ii) a plurality of video segments, within the video, each relating to the depicted plot point; (iii) synchronization data to a video segment from within video content that is additional to the video and that is responsive to the depicted plot point; and (iii) a linkage that is responsive to the depicted plot point.

How Function

Data created for, or utilized by, the How function comprises, for example: a segment definition; a write-up to provide, for example, an in-video explanation of how the shot, clip, or scene was filmed/created; a linkage to more detailed technical information, and a linkage to video specific information. The How function is principally dedicated to cinematography as art and as technique. For example, in the motion picture Citizen Kane, the video map defines a segment by frames numbers 39903-40330. The segment relates to the scene when Kane's business manager and Kane's personal banker are reading a contract that relinquishes Kane's involvement with his newspaper after it has gone bankrupt. Kane enters the frame and slowly walks towards the back of the office. The background behind Kane is a wall of windows, seemingly of normal size. As he keeps walking, the wall appears much higher and further away than it initially seemed and Kane appears to be dwarfed by it. The write-up to support the How function comprises the following explanation: "The director, Orson Welles, and cinematographer, Gregg Toland, used a combination of forced perspective and deep focus cinematography. In forced perspective, an optical illusion is created to depict a subject or object to appear farther away, closer, larger, or smaller than it actually is. The set of the office was built on an enormous scale, with the office being much larger and the walls much taller than they appear. Deep focus allows objects in the background (in this case, Charles Foster Kane) and foreground (Mr. Bernstein and Thatcher) of a shot to be simultaneously in sharp focus." The video map associates a Forced_perspective and a Deep_focus wiki links to provide additional technical information.

A write-up and technical cinematic link need not be tailored to each shot or video. Alternatively, the segment definition may be associated, by a reference identifier, with one of a set of standardized technical write-ups detailing in general terms a specific cinematic method implemented and a corresponding technical link. Further, the write-up and links may be retrieved from an application dedicated website rather than from a third party site. Still further, a video map may further provide a link to video specific cinematic information. For example, in the movie Sin City, a Youtube video titled "All Green Screen Version" is available that demonstrates how the green screen technique was utilized throughout the movie. The video map may associate the segment with the title of the video, and identifier of the video, or directly with the link: http://www.youtube.com/watch?v=lbOsC_19uus. The related video may be played in a window superimposed on the movie, side by side, with or without stopping the playing of the movie.

In one embodiment, rather than generating specific data to identify segments suitable for the How function, the Search feature item data is mined for the identification of noteworthy cinematic technique (e.g., special effects, cinematography, editing, and transitions). For example, the ITM department creates a video map that defines noteworthy cinematic segments and associates appropriate keyword strings such as:

```
filmmaking.FX.VFX.special.visual.effects.cgi.motion.capture.mocap
filmmaking.FX.VFX.special.visual.effects.effect.model.miniature
filmmaking.cinematography.shot.arc.rotation
filmmaking.cinematography.shot.effect.optical.focus.deep
filmmaking.editing.shot.cut.jump.match.graphic
filmmaking.editing.montage
transition.wipe.diagonal
transition.fade.out.to.black
```

In this type of embodiment, the How function relies on the ITM/s department filmmaking/cinematography keyword search data to identify the segments and to indicate the specific cinematic technique being recognized. The display of How information need not be limited to the keywords. The keywords provide an indirect link to standardized write-ups covering the specific cinematic technique as well as to linkages to external detailed information. Standardized write-ups and the like need not be supplied with a video map of each movie. Instead, standardized write-ups and the like are supplied by an application initialization map and updated as required. Alternatively, or additionally, the keyword data may be supplemented with video and segment specific write-ups. The term "write-up" shall mean any type of information whether provided in written, audio, and/or video form.

Figure 3D:
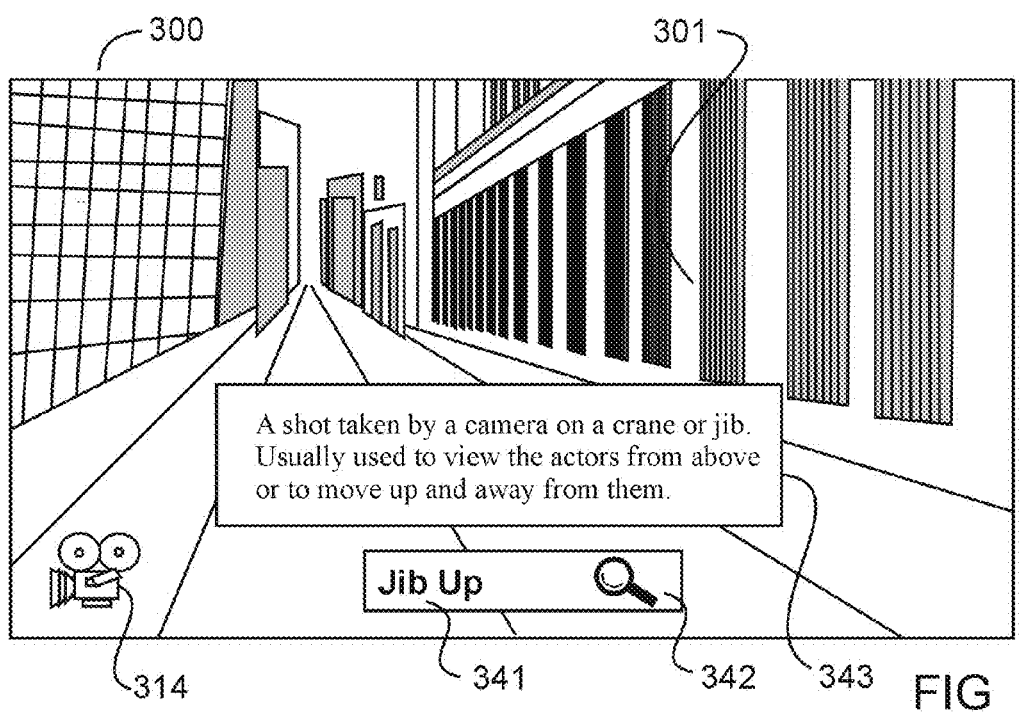
FIG. 3D is a representation of a video frame within a motion picture and the display of How function information.

FIG. 3D is a representation of a video frame within a motion picture and the display of the How function information. In this illustration, following, or independent of, notification that cinematic information is available 314, a user's activation of the How function and responsive to the location in the video, cinematic information is displayed. In this illustration, the cinematic information identifies the particular technique utilized 341 (i.e., Jib Up). In this instance the Search filmmaking/cinematography data is utilized to both identify segments and provide a first level of information. The keyword string associated with the Gotham National Bank segment in the motion picture The Dark Knight is as follows: filmmaking.cinematography.s-hot.jib.crane.boom.up.upward. In a simple embodiment, the Search string is associated with the label "Jib Up" which is utilized for identification display 341. Innovatively, taking advantage of the Search feature of the player application, the How function also provides the user the capability to automatically search 342 within the movie, or preferably from within other movies in the videobase, for other examples of the identified cinematic technique. In such an embodiment, the keyword string provides the means for efficient and exacting search. This capability to easily search a large library of motion for examples of a specific cinematic technique is particularly advantageous in the study of the art.

An information write-up may be provided that is specific to the segment and the identified information item (e.g., cinematic technique). Alternatively, the segment label descriptor is associated with a generalized write-up 343. For example, a generalized write-up would explain that a Jib Up cinematic technique comprises: "A shot taken by a camera on a crane or jib. Usually used to view the actors from above or to move up and away from them". The video map would also provide the source (e.g., Wikipedia) and a linkage to additional information (http://en.wikipedia.org/wiki/Crane_shot). Alternatively, other external content may be searched and made available to the user by a related search capability 342 or made available by linkages included in the video map. An information write-up 343 may be simultaneously provided with initial information 334.

As herein defined, a write-up is not limited to the written word. Specially, with the How function, it is particularly advantageous that the write-up be, in fact. a multimedia presentation including video and audio (e.g., a video) to better explain a particular cinematic technique. The video presentation should be brief to enhance, rather than detract, from a conventional movie playback experience.

In one of many embodiments for providing information for a cinematic technique depicted during the playing of the video, a method comprises the steps of: receiving from a user, during a playing of a video, a request for cinematic technique information; identifying, responsive to the request, a location in the video; retrieving a plurality of segment definitions; selecting, from the plurality of segment definitions, a segment definition that is responsive to the identified location, the selected segment definition is associated with (i) an identification of a cinematic technique depicted within a video segment defined by the selected segment definition, (ii) a write-up that is responsive to the identified cinematic technique, and (iii) with a linkage that is responsive to the identified cinematic technique; providing the identification of the cinematic technique depicted within the video segment; providing the write-up that is responsive to the identified cinematic technique; receiving from the user a request for additional information relating to the identified cinematic technique; and providing, responsive to the user request and the linkage, additional information relating to the identified cinematic technique. Additional features are provided by, for example, the step of playing from within the video or a plurality of videos, responsive to the identified cinematic technique, and responsive to a keyword search, a plurality of video segments each depicting the identified cinematic technique.

In one embodiment, a video map comprises a segment definition that defines a video segment within a video, the segment definition is associated with (i) an identification of a cinematic technique depicted within the video segment defined by the segment definition; (ii) a write-up that is responsive to the cinematic technique; (iii) a linkage that is responsive to the identified cinematic technique; and (iv) a plurality of video segments, within the video or a plurality of videos, each video segment depicting the identified cinematic technique.

Info Function

Data created for, or utilized by, the Info function comprises, for example, a segment definition; a write-up to provide an in-video brief information about the item; and a linkage to more detailed information. For example, in the motion picture Casino Royal, the video map defines a segment by frames numbers 106739-106983. The segment relates to the character James Bond ordering a martini. The write-up to support the Info function comprises the following recipe: "The Vesper Martini: Ingredients: 3 measures of Gordon's Gin, 1 measure of vodka, ½ measure of Kina Lillet, and Lemon peel for garnish. Directions: Pour the gin, vodka and Kina Lillet into a cocktail shaker over ice and shake (don't stir!) well until ice-cold. Strain into a martini glass and add a lemon peel as a garnish. Drink it with the swagger of a certain British spy, then thwart your enemies and get the girl. All in a day's work." The video map associates the following information link: http://www.jamesbondlifestyle.com/product/vesper-martini. The following keyword strings are associated with the segment depicting James Bond ordering a martini:

---

[Daniel.Craig=James.Bond]
<individual.person.adult.male.guy.man.middle.aged>.-
<white.Caucasian.British.English>.007(order)
[Martin.Ucik=Barman]
<individual.person.adult.male.guy.man.middle.aged>.-
<white.Caucasian.European.Slavic.Montenegrin>.bartender
James.Bond.beverage.drink.mixed.alcoholic.alcohol.liquor.-
cocktail.martini.vodka.dry.shaken.not.stirred.with.thin.slice.of.lemon.peel.-
The.Vesper.recipe
beverage.alcohol.liquor.gin.Gordon
beverage.alcohol.liquor.aperitif.Kina.Lillet.Blanc

---

In the motion picture The Godfather, the video map defines a segment (clip) by frames numbers 1824-10830. The clip relates to the scene when Amerigo Bonasera, asks Don Corleone to kill the two men that raped and beat his daughter. The Don tells Bonasera that murder would not be justice as his daughter is still alive, but he agrees to make the two men suffer as she suffered. A businessman himself, the Godfather lets Bonasera know that he is now indebted to him. In this example, the write-up to support the Info function comprises the following explanation: "Capo di tutti capi or capo dei capi, often referred to as the Godfather in English, is Italian for 'boss of all bosses' or 'boss of bosses'. It is a phrase used mainly by the media, public and the law enforcement community to indicate a supremely powerful crime boss in the Sicilian or American Mafia who holds great influence over the whole organization." (Source: Wikipedia) The video map associates the following information link: http://en.wikipedia.org/wiki/Capo_di_tutti_capi.

Figure 3E:
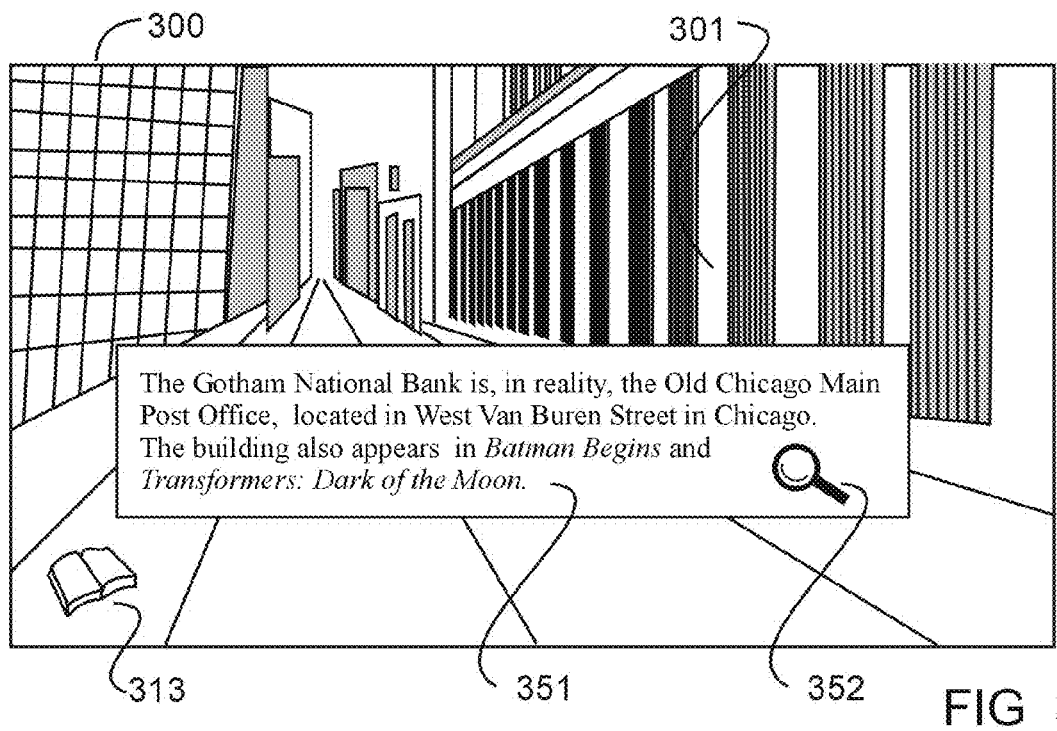
FIG. 3E is a representation of a video frame within a motion picture and the display of Info function information.

FIG. 3E is a representation of a video frame within a motion picture and the display of Info function information. In this illustration, following, or independent of, notification that item information is available 315, a user activation of the Info function and responsive to the location in the video, item information is displayed 351. In this illustration, the item information 351 comprises the following information write-up: "The Gotham National Bank is, in reality, the Old Chicago Main Post Office, located in West Van Buren Street in Chicago. The building also appears in Batman Begins and Transformers: Dark of the Moon." The information write-up may be written specifically for the Info Function, or obtained from, for example, the Where function data. Innovatively, taking advantage of a videobase (i.e., multi-video) and the Search feature of the player application, the Info function also provides the user the capability to automatically search 352 the referenced movies for segments depicting the Old Chicago Main Post Office. Alternatively, other external content may be searched and made available to the user by a related search capability 352. The main point being illustrated is that the data in a video map that supports the various features and functions is synergistically interrelated.

Many sources either provided or integrated with the video or external to the video may provide additional item information, including, for example, a variety of web sites, or various sources that may identify items present in a video. Retrieval of additional information may be real-time, or non-real-time and pre-stored in volatile or non-volatile memory for use when needed. While additional item information may comprise many items and categories of additional item information, there is no requirement that additional item information itself provide any specific information. The video map would provide linkages and other information necessary for the application to automatically access, retrieve, and/or download the additional item information.

In one embodiment for providing information, a method comprises the steps of monitoring a play location within a video; searching item location information to identify an item whose depiction within the video is responsive to the request location; displaying, responsive to an identified item, an indication that item information is available for an item being depicted; receiving, from a user, a request for item information in response to the display of an indication that item information is available; identifying a request location that is responsive to the request for item information; identifying at least one item that is responsive to the request location; and displaying item information associated with the at least one item that is responsive to the request location.

Playback Function Controls

Figure 4A:
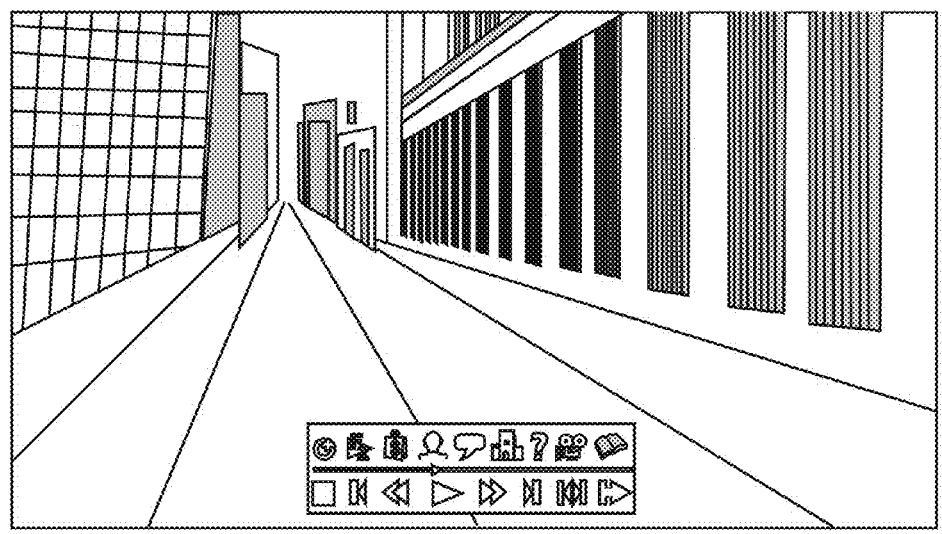
FIG. 4A is a representation of a video frame within a motion picture comprising an on-screen play control panel.

To activate the video playback functions, a user may be provided a number of means, including, onscreen playing controls, remote control keys, voice control, other user interfaces, and/or any combinations of these methodologies and means. FIG. 4A is a representation of a video frame within a motion picture comprising an on-screen play control panel 401 as may be advantageously implemented in, for example, a personal computer mouse control embodiment, a touch screen control embodiment, or smartphone application. On either embodiment, clicking or touching the lower portion of the screen would cause the display of the play control panel 401 that comprises a plurality of buttons/objects each associated with a respective event.

Figure 4B:
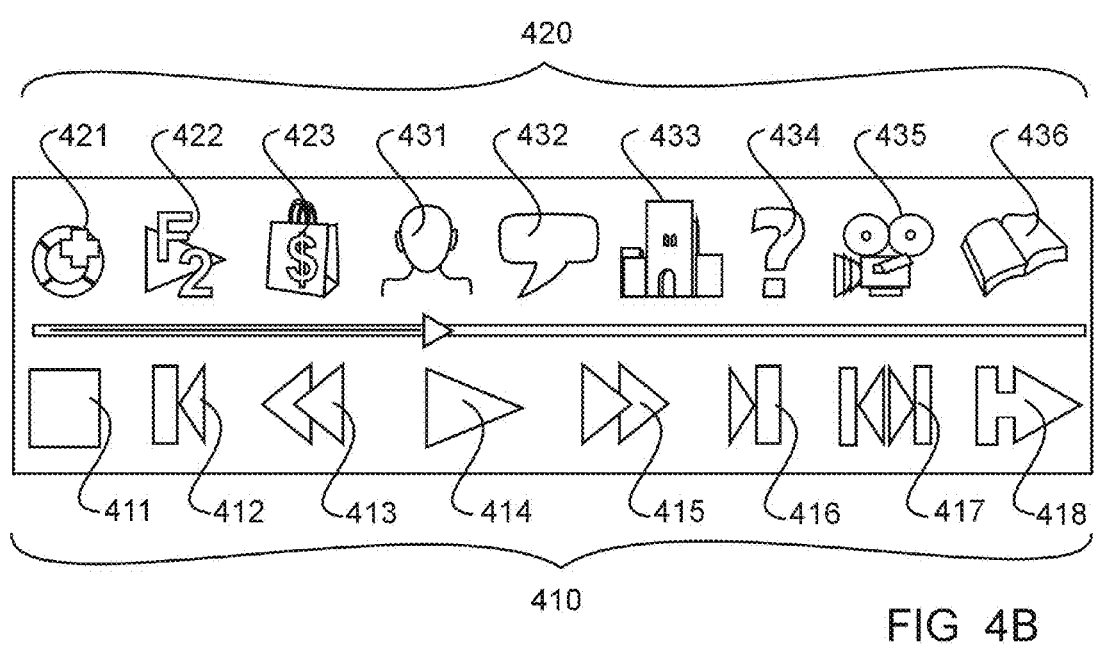
FIG. 4B is a magnified representation of an on-screen play control panel.

FIG. 4B is a magnified representation of an on-screen play control panel. The play control panel comprises a plurality of play control buttons/objects 410, such as Exit 411, Skip Back Clip/Segment Set 412, Fast Rewind 413, Play/Pause Toggle 414, Fast Forward 415, Skip Forward Clip/Segment Set 416, Play Current Clip 417, and Play From 418. The "Play Current Clip" function utilizes the clip database portion of a video map to identify a clip definition that is responsive to the current play position and automatically rewind to the beginning of the clip and play from that position. The "Play From" function enables a user to continue playback from a current position in the video irrespective of the particular feature that is currently being used. For example, a user may utilize the Search feature to obtain a list of segments that are responsive to a keyword search. While playing one of the segments in the list, the user may activate the Play From function to play the video from that point in the segment. Advantageously, the Play From function is further responsive to a user pre-established presentation preference (e.g., Play As Is or Custom presentations). Without a pre-established presentation preference the Play From function may be set to default to the Custom presentation rather than, for example, the Play As Is presentation. Alternatively, the Play From function defaults to playing the last presentation played by that user for that movie.

The play control panel also comprises a plurality of buttons/objects 420, such as Help 421, Features Menu 422, Shopping Indication/Information 423, and playback function activation Who 431, What 432, Where 433, Why 434, How 435, and Info 436. Clicking or pressing the Where button/icon 433, for example, activates the Where function routines causing the display of item information for a depicted item (i.e., in this case, a locale). Activation of a play function notification routines may be performed by, for example, an options menu, double clicking an icon, and/or separate on screen prompts.

Figure 4C:
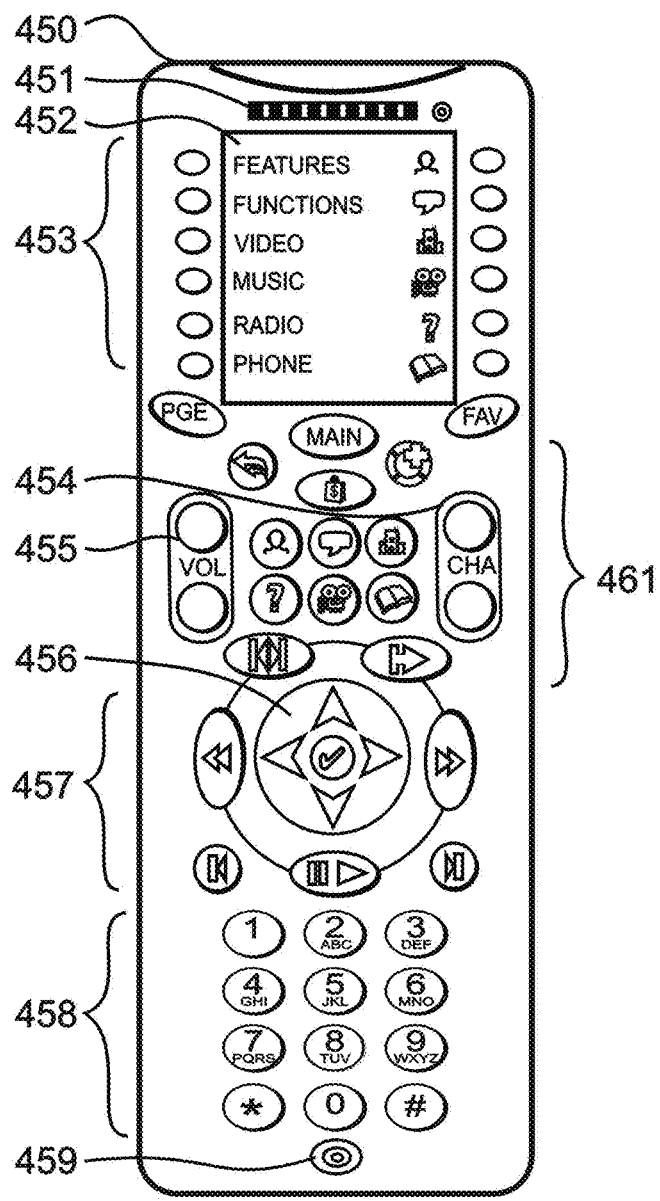
FIG. 4C is an illustration of a remote control device comprising dedicated function keys.

A remote control device as per the teachings herein may be based on any number of technologies both wired and non-wired. FIG. 4C is an illustration of a remote control device 600 that, for example, comprises: speaker 451; a display screen 452 that additionally responsibly labels interactively defined function keys 453; channel controls 454; volume controls 455; screen position and menu controls 456; play control keys 457 (e.g. Pause/Play); alphanumeric key pad 458; and microphone 459. This particular remote control implements a plurality of dedicated function activation keys 461 similar to those provided in the on-screen control panel illustrated in FIG. 4B. On the reverse side of the remote control, to facilitate the use of the Search feature, a qwerty-style keyboard, functions keys, screen position and menu controls; and play control keys are also provided. Alternatively and advantageously, a smartphone application provides all the functionality of the remote control and on-screen interfaces. The smartphone may communicate with the player via Wi-Fi capability.

Feature Presentations with Functions

In a preferred embodiment, if a user has activated one or more of the playback information functions (e.g., Who, Where, Why, How, and Info) in notification mode, then, during the playing of a video, an indication is displayed that item information is available for an item being currently depicted with respect to one or more categories of content of interest to the viewer. Item notification offer a number of advantages including, for example, a better match between a request for item information for a particular item being depicted and the availability of corresponding item information. To some users, the item notification enhancements disclosed herein offer a better user experience with obtaining item information for an item being depicted in one or more of a plurality of informative and entertaining playback functions.

Figure 5:
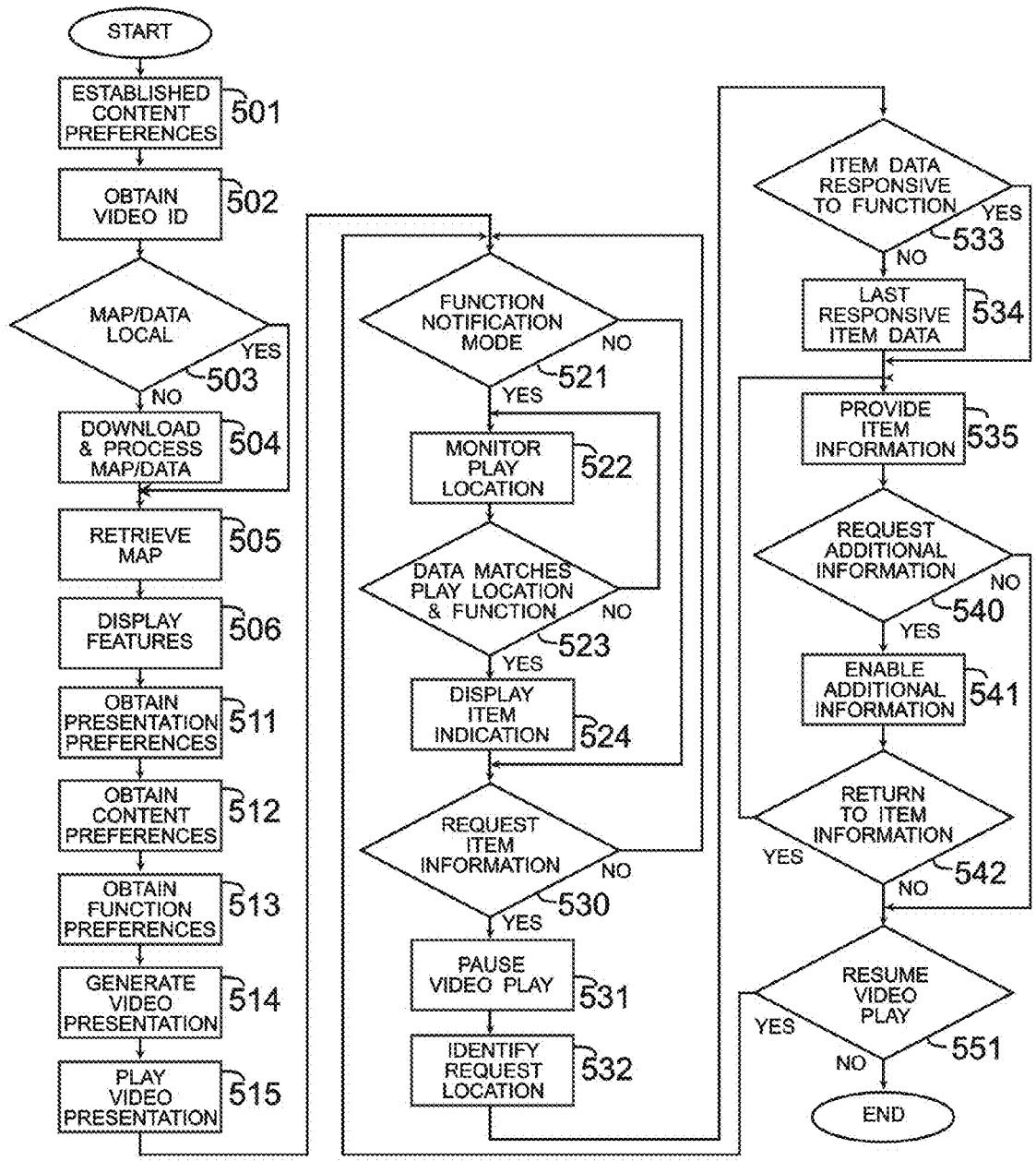
FIG. 5 is a flow chart of a method of playing a presentation with playback functions.

FIG. 5 is a flow chart of a method of playing a presentation with playback functions. Typically, a user would have pre-established content preferences 501 prior to playing a video. Following user selection of a video or a plurality of videos, the video ID(s) are obtained 502 to determine if a map and other data is available for the video(s) 503. If a map is not locally available 503, or if updating of maps is automatically performed at this point, then the map is downloaded from a remote source and processed 504 (e.g., merged with local user database and/or updating). If a map is locally available 503 or following download 504, the map is retrieved 505 to display the available features 506. The user's presentation preference is obtained 511, and content preferences if not previously obtained are obtained 512. The presentation preference and content preferences are applied to the video map to generate a video presentation 513 (e.g., a playlist of segment definitions defining video segments from within the video). If video playback function preferences were pre-established, the user's function preferences are obtained 514 and the video presentation is played 515. A user's function preferences may be pre-established, established, and/or modified at any time (e.g., contemporaneously with pre-establishing content preferences, prior to playing a video, prior to playing a feature, and during the playing of a presentation).

If item notification routines have been activated 521 (e.g., Who, Where, Why, How, and Info) in notification mode, then the player application monitors a play location within a video 522. Once a play location is identified, the item data is queried (e.g., a plurality of segment definitions are searched) to identify segment definitions that are responsive to the play location and the particular function(s) activated 523. If no segment definition is responsive, then the play location is continued to be monitored 522. If a segment definition is responsive 523, an indication that item information is available for an item being depicted is displayed 524. If a request is not received from a user for item information 530 in response to the display of an indication that item information is available 524, then, if the function notification mode is still activated 5521, the play location is continued to be monitored 522.

If a request is received from a user for item information 530 in response to the display of an indication that item information is available 524, then the playing of the video is automatically paused 531 if not already paused. Alternatively, the pausing of the video 531 may be optional as a user may desire that the video continue playing while the item identification routines dynamically respond to changes in the current play location. A user may prefer to obtain contemporaneously updated frame accurate identification of items as the video continues to be played. In such cases, user preference would disable the routines from automatically pausing a playing of the video.

A user may request item information using a variety of technologies and methodologies. For example, clicking or pressing an item information play control button/object in an user interface would be received, during a playing of a video, as a request from a user for item information relating to an item depicted within the video. As detailed with respect to the play control panel, clicking or pressing the Where button/object causes the activation of the display of Where item information routines, and the display, when available of locale item information. In the case of the use of a remote control device, pressing an appropriate function key would be received, during a playing of a video, as a request from a user for item information relating to an item depicted within the video. As detailed with respect to the remote control device, the remote control's Where dedicated function activation key enables a user to request, during a playing of a video, item information relating to an locale depicted within the video.

Contemporaneously with a pausing of the playing of the video 531, a request location (e.g., time code, frame identifier, or some other indicator of the place or location, within the video that is currently being played) is identified 532 that is responsive to the request for item information. A location within the video may be identified by a variety of means including, for example, time codes in a seconds and milliseconds format or an HH:MM:SS:FF (Hours, Minutes, Seconds, and Frames) format, frame identifiers, bit positions, logical positions identifiers, or any format or other indicator that can consistently accurately identify a location in a video. A location may also be referred to as a position or place. In a multi-video embodiment, the identification of the video being currently played is particularly material in those situations where the presentation comprises the playing of segments retrieved from within a plurality of videos. The video may be identified by any of a number of methodologies being currently practiced or known in the art.

Dependent on the particular embodiment, to allow for delays by the user to request item information, the identification of the request location 532 may be responsive to a pre-established delay adjustment preference, such as, a user's specific previously defined amount of time, e.g. 10 seconds. Herein, whether a user's preference or a system's preference pre-established means that the amount is not dependent on a user's action at the time of the request. Pre-established does not necessarily mean that the preference is not responsive to the particular segment being played. In those instances that the playing of the video is voice controlled, separate default values may be established to accommodate the fact that user may be more likely to say "where" or "why" faster than to be able to press a button on a remote control specially while viewing a full length motion picture. To facilitate voice response audio commands may be adopted such as "cpwho", "cpwhat", "cpwhere", "cpwhy", "cphow", and "cpinfo". Alternatively, a user may teach the player a user preferred set of voice commands. In one embodiment, rather than a user configuring the system at the time of installation or a first playing, autoactive software routines would learn the user's preferences from the user's actions or commands, and adjust the various settings accordingly.

Once a request location 532 is identified, the item data is queried (e.g., a plurality of segment definitions are searched) to identify segment definitions that are responsive to the request location and the playback functions that are activated 533. A segment definition is responsive when it includes the request location within the beginning and ending of the defined segment and is associated with information that is responsive to an activated function. A request location matching either the beginning point, the ending point, or any point in between is deemed to be within the beginning and ending. In one embodiment, identifying a segment definition that is responsive comprises, for example, comparing the time code of the request location and finding a segment definition having a beginning time code that is the same or earlier than the time code of the request location, and having an ending time code that is the same or later than the time code of the request location.

If a responsive segment definition is found 533, then item information associated with a responsive segment definition is provided 535 (e.g., displayed, played, and/or retrieved). To accommodate those situations, in which at the time that the user has requested item information, a segment definition is not responsive, the request location may be adjusted to include the request location and a predetermined play period prior to the request location, for example, 30 seconds. In this fashion, a segment definition may be responsive to the information request or a predetermined play period prior to the request location. In determining if a segment is responsive to the request location or a predetermined play period prior to the request location, the segment definition maybe adjusted and/or the request location/period may be adjusted. Advantageously, this method enables the retrieval and display of item information associated with a number of recently played depictions of items having item information available. The item identifying information, such as an item image and descriptors, that are retrieved and displayed enable identification by the user.

Item information may have been already retrieved and loaded into processing memory, and, thus, retrieval is from the memory. Alternatively, the item information is retrieved from any of a variety of storage memories as needed. Herein, the term "retrieve" should be understood in the broadest sense and comprises obtain, acquire, procure, download, transfer, extract, and to come into possession by any means or methodology from a local and/or remote source.

If, for example, a user requests item information for an item that was no longer being depicted, a segment definition may not be found that is responsive to the request location 533. In such situations, a proper message is displayed (e.g., item information not available for this location). Alternatively, a number of methodologies may be implemented to provide item information 535 for a most recently depicted item for which item information is available 534. For example, segment definitions are searched to identify a segment definition that has an ending point prior to and closest to, within certain parameters, the request location.

If a user requests additional item information 540 relating to displayed item information, then the display of additional item information is enabled 541 in response to the request for additional item information. It is understood that the retrieval, providing, and displaying of additional item information may be subject to the control of a third party provider or a source not within the control of the user's apparatus. The term herein "enabling a display" does not guarantee or require that in fact additional item information is retrieved, provided and/or displayed. For example, item information may be linked to a remote source that customarily provides additional item information but the source is not accessible at the particular time of the user request for additional item information. Such situations still satisfy the "enabling a display". Additional item information comprises, for example, information specific to the purchasing of the item, a transfer to a website's one click page, content previously downloaded, and content retrieved from within the video or from within a plurality of videos. For example, additional item information may provide depiction of the item extracted from a full-length movie franchise.

A user may request additional item information using a variety of technologies and methodologies. For example, clicking or pressing an item information play control button/object in an user interface would be received, during the display of item information, as a request from a user for additional item information relating to a single item for which item information is displayed. Similarly, in the case of the use of a remote control device, pressing an appropriate key would be received, during the display of item information, as a request from a user for additional item information relating to a single item for which item information is displayed. Where item information is displayed for multiple items, selection of a desired one of the displayed item information would be required in connection with, for example, the clicking or pressing of an item information play control button/object or key in a user interface or remote control. For example, the displayed item information previously detailed in FIG. 3B each constitute a button/object associated with a "clickable" event that when activated or selected by the user would constitute an additional item information request. In a remote control embodiment, the screen position and menu control keys, the context displayed function keys, and the dedicated function keys enable a user to select the desired one of the item information.

The display of multiple item information may be limited to a system or user pre-established number of the last depicted items prior to the request for item information. In a preferred embodiment up to five item information are displayed for items that were depicted within 30 seconds of the item information request, with the most recently depicted item being displayed to the right of the others.

Termination of the display of additional item information 542 returns to the screen/menu providing multiple item information 535 rather than automatically resume video play 551. This would be particularly advantageous where multiple item information is displayed. Alternatively, termination of the display of additional item information 551 automatically resumes video play. A termination of the display of additional item information may take many forms, such as exiting the additional information function (e.g. exiting a website, and exit or escape request). Any terminating event that indicates that the user desires to resume video play may be considered a video play request.

If a user does not request additional item information relating to displayed item information 540, then a resume video play request is monitored and if received 551, display of the item information is terminated and play of the video is resumed responsive to the item information request location. At this point, unless terminated by another process, the item identification routines, subject to the function notification mode 521, restart at the appropriate one of the monitoring of a play location 522 or monitoring of a request for item information 530. If the resume video playback is terminated 551, the process may end, or restart at any suitable point (e.g., display feature 506, or obtain video ID 502) responsive to the terminating action (e.g., a new optical disc is detected).

When the user elects to exit the additional information environment, e.g., a page in a website, the playing of the video may be automatically resumed at a location that is responsive to the request location. Resuming a playing of the video responsive to the request location following a termination of a displaying of additional item information does not require resuming a playing of the video at the exact location at which the request for item information was received. The resumption location may be additionally responsive to other considerations including, for example, technical limitations. In a preferred embodiment, rather than resuming a playing of the video at a location that is responsive to the request location, a playing of the video is resumed at a location that is also responsive to one or more determinants, such as, the amount of time that the playing of the video has been paused, the beginning or ending of the segment depicting the item, and/or a beginning of a clip or scene. The suitable location for resuming the playing of the video may be directly identified by a segment definition that is responsive to the request location. Further, the automatic resuming of the playing of the video may itself be responsive to the number of item for which item information is displayed. For example, if item information is displayed for multiple items, then the playing of the video would be not be resumed following a termination of a displaying of additional item information.

The flow chart of FIG. 5 has been intentionally drafted to disclose a number of possible embodiments. A number of permutations, combinations, substitutions, and/or additions in the specific steps, and recursive functions may be initiated at different points in the process than those illustrated. Further, the detailed disclosure herein offer additional elements that may be synergistically, additionally or alternatively, implemented in one of many possible embodiments of the Who, Where, Why, How, and Info functions. The inventions are not limited to any particular embodiment. Many combinations of the various elements are possible to fit each of a multitude of situations. Most importantly, it should be appreciated that the playback functions (e.g., Who, What, Where, Why, How, and Info functions) are intended to be available during the playing of each of the presentations features (e.g., Presentations, Compilations, Subjects, Dilemmas, Best Of, Performers, Shopping, Music, Search, and Preview). Thus, in a preferred embodiment a video map comprises, for example, the information to support a user's version preferences, presentation preferences (e.g., Presentations, Compilations, Subjects, Dilemmas, Best Of, Performers, Shopping, Music, Search, and Preview), content preferences, and playback functions (e.g., Who, What, Where, Why, How, and Info functions). Accordingly, a player application performs the steps consistent with such a full featured video map.

To further explain, in one of many embodiments a method comprises the steps of: (i) enabling a user to pre-establish content preferences for a level of explicitness in each of a plurality of content categories of possibly objectionable content; (ii) retrieving a video map comprising: (a) a first plurality of segment definitions defining video segments within a video, the defining being responsive to the level of explicitness in each of the plurality of content categories of possibly objectionable content; (b) a second plurality of segment definitions defining video segments within the video, the defining being responsive to at least one presentation of the video less in length than the length of the video; (c) a segment definition that is associated with an identification of a performer of a character depicted within the video; (d) a segment definition that is associated with an actual identity of a locale depicted within the video, the actual identity of the locale being different than a locale identity as represented in the video; (e) a segment definition that is associated with a plot explanation for a plot point depicted within the video; and (f) a segment definition that is associated with an identification of a cinematic technique depicted within the video; (iii) enabling the user to establish a presentation preference; (iv) automatically selecting video segments from within the video, the selecting being responsive to an application of the content preferences and presentation preference to the video map; (v) playing the selected video segments as a video presentation; (vi) receiving from the user, during a playing of the video presentation, a locale information request; (vii) identifying, responsive to the locale information request, a first location in the video presentation; (viii) selecting, from the segment definitions, a segment definition that is responsive to the identified first location and the locale information request; (ix) providing, responsive to the selecting, the actual identity of a locale depicted within a video segment defined by a responsive segment definition; (x) resuming, responsive to the identified first location, a playing of the video presentation; (xi) receiving from the user, during the resumed playing of the video presentation, a plot explanation request; (xii) identifying, responsive to the plot explanation request, a second location in the video presentation; (xiii) selecting, from the segment definitions, a segment definition that is responsive to the identified second location and the plot explanation request; (xiv) providing, responsive to the selecting, a plot explanation for a plot point depicted within a video segment defined by a responsive segment definition; and (xv) resuming, responsive to the identified second location, a playing of the video presentation.

Clearly, a most preferred embodiment is not limited to the simplified embodiment illustrated above. FIG. 5 details the extensive functionality that is provided by the multiple playback functions. Further, while the content preference and presentation preference steps precede the playback functions in FIG. 5 as would be the case in some situations, it is not always the case. For example, as previously indicated, an adjustment of content preferences may take place at any time during video playback.

A combination of a presentation preference and a function preference is particularly innovative and advantageous in providing a highly customized and enhanced movie experience for, specially, a narrowly targeted audience. For example, the combination of an "Intellectual" presentation that focuses on the plot points of a movie (e.g., Cloud Atlas) together with the Why function enabled offers material advantages to the user that desires to focus on the intellectual aspects of the movie rather than on, for example, the action clips. The enablement of the Why function provides the additional intellectual insight that that user would prefer. Advantageously, a information mode may be selected by the user that automatically pauses the playing of the video and provides responsive information consistent with the enabled playback function as the presentation is played. To accommodate such a mode the map may further associate with the segment definition a time deemed adequate for the playback to be paused and automatically resumed. Alternatively, the resumption of the playback would be responsive to a user playback resumption request. Still further, since many of the presentations in the Presentation feature fall within certain standardized categories, a user may pre-establish combinations of categories of presentation (e.g., Intellectual) with one or more playback functions (e.g., How and Why).

To further detail, in one of many embodiments a method comprises the steps of: (i) retrieving a video map comprising (a) a first plurality of segment definitions defining video segments within a video (e.g., Cloud Atlas), the defining being responsive to at least one presentation of the video less in length than the length of the video (e.g., an "Intellectual" presentation); and (b) a second plurality of segment definitions, each of the segment definitions being associated with item information (e.g., plot explanation) for an item (e.g., plot point) depicted within the video; (ii) enabling a user to establish a presentation preference (e.g., an Intellectual Presentation) and a function preference (e.g., Why playback function); (iii) automatically selecting, responsive to the presentation preference and the first plurality of segment definitions, video segments from within the video; (iv) playing the selected video segments as a video presentation (e.g., an Intellectual presentation); (v) monitoring a play location within the video presentation; (vi) searching the second plurality of segment definitions to identify a segment definition that is responsive to the play location and the function preference (e.g., Why playback function); (vii) providing, responsive to the identification of a responsive segment definition, an indication (e.g., Why on-screen icon) that item information (e.g., plot explanation) is available; (viii) receiving, from the user, a request for item information; (ix) pausing the video presentation in response to the request for item information; (x) providing, responsive to the request, the available item information (e.g., plot explanation); and (xi) and resuming, following a termination of a displaying of item information, a playing of the video.

In an alternative user configuration, a method, for example, comprises the steps of: (i) retrieving a video map comprising (a) a first plurality of segment definitions defining video segments within a video, the defining being responsive to at least one presentation of the video less in length than the length of the video; and (b) a second plurality of segment definitions, each of the segment definitions being associated with item information for an item depicted within the video; (ii) enabling a user to establish a presentation preference and a function preference; (iii) automatically selecting, responsive to the presentation preference and the first plurality of segment definitions, video segments from within the video; (iv) playing the selected video segments as a video presentation; (v) receiving from the user, during a playing of the video presentation, a request for item information; (vi) identifying, responsive to the request, a location in the video presentation; (vii) selecting, from the second plurality of segment definitions, a segment definition that is responsive to the identified location; and (viii) providing, responsive to the selected segment definition, item information.

Video Map

In a preferred embodiment, a video map is a SQLite database comprising a plurality of segment definitions each defining a video segment within a video, and/or comprising a plurality of video frame identifiers. A segment definition defines (e.g., identifies) a begin video frame and an end video frame of a segment within a video. Alternatively, a segment definition identifies a single video frame. A video frame is any image or partial image in any digital or analog format comprising, for example, a frame of video, a video field, and an I, B, or P video frame. A video frame or position in a video may be identified by a variety of means including, for example, time codes in an HH:MM:SS:FF (Hours, Minutes, Seconds, and Frames) format, sequential frame integer format FFFFFF, bit positions, logical positions, physical location identifiers, or any format that can identify a location or position in a video. A video frame may comprise or be associated with audio information. A segment definition may be further associated with a descriptor and/or linkage. The terms "define", and "identify" should be understood in the broadest sense and comprises the meanings associated with the following terms: define, identify, detail, indicate, enumerate, and stipulate.

There are a number of different methods that may be implemented for a segment definition to define a beginning and an ending of a video segment within the video. For example, a segment definition may directly specify a beginning point of a portion of content (e.g., a segment) within the video, and directly specify an ending point of a portion of content within the video. In a second example, a segment definition may directly specify a beginning point of a portion of content within the video, and indirectly specify an ending point of a portion of content within the video by specifying the duration of the portion of content. In a third example, a segment definition may indirectly specify a beginning point of a portion of content within the video and indirectly specify an ending point of a portion of content within the video, by, for example, individually specifying one or a plurality of individual units of content (e.g., a video frame or a group of pictures). A segment definition may define, responsive to a depiction of an item, a beginning and an ending of a video segment within the video by, for example, identifying a single video frame. A segment definition may comprise the identification of a single video frame rather than the identification of a begin video frame and an end video frame.

In a playback function embodiment, a video map associates a segment definition with a descriptor providing information responsive to an item being depicted within the defined segment. A segment definition and descriptor may be individually responsive to a single depicted item or to multiple depicted items. Segment definitions may overlap but not necessarily congruently with other segment definitions and/or frame identifiers. There are a variety of methods for associating descriptors with a segment definition or video frame identifier. For example, a descriptor (e.g., item information) is associated with an item, the item is associated with a frame location(s) where the item is depicted within the video, and the frame location(s) is associated with a segment definition. In that example, item information is indirectly associated with a segment definition. Information associated with a segment definition or video frame identifier does not require any particular direct or indirect methodology.

A video map provides the information required by a feature or range of features that enable the customized playing and retrieval of content and information from within a video, and provides the information required by a range of playback functions. The range of presentation feature sets supported by a video map may comprise, for example, Presentations, Compilations, Subjects, Dilemmas, Best Of, Performers, Shopping, Music, Search, Preview, and Control, as well as many others. For example, the Presentations feature sets enable the user to select among a "60 Minutes" presentation, a "Custom" presentation that is responsive to the user's preferences for the level of explicitness in each of fourteen categories of possibly objectionable content (e.g. violence), a presentation that focuses on the action, a presentation from a character's perspective, and to play the movie as is. (The feature sets are detailed further below.) The range of playback functions supported by a video map may comprise, for example, the What, Who, Where, Why, How, and Info playback functions. (The playback functions are detailed further below.)

In the case of a 60 Minutes presentation, the video map provides a plurality of segment definitions whose total playing time is between 55 and 60 minutes prior to any objectionable content customization. The segment definitions in a presentation's table are associated with an appropriate descriptor (e.g., 0, 1, 2, etc.) to differentiate those segment definitions from segment definitions that may correspond to a different presentation. The descriptors reference a separate table that associates a descriptor with a presentation name (e.g., 60 Minutes) for display in the UI.

The video map further comprises a descriptor that references a visual depiction that is representative of a corresponding presentation. A visual depiction is any image or representation in image form, irrespective of the source, motion, quality, or relative size. A reference comprises, for example a direction, pointer, instructions, location to a source within the video, associated with the video, external to the video, remote to the video, or unrelated to the video. In a preferred embodiment, the reference to a visual depiction of a presentation comprises a timecode to a location within the video from which a depiction of a video frame suggesting the character of the presentation may be extracted. Alternatively, for example, the descriptor comprises a link to an image available at a website or webpage.

The creation of the information in a video map supporting, for example, the 60 Minutes presentation may be guided by written guidelines and data formats ("specifications") that facilitate standardizing the methodology implemented in defining segments and assigning descriptors. Use of the specifications ensures a consistent quality experience for a user irrespective of the particular movie. In a preferred embodiment, the creation of segments definitions for a specific feature or playback functions is executed by a trained editor ("mapper") guided by a feature specific specifications to create consistently elegant definitions of segments for that feature or function.

A video map, segment information, frame identifiers, and/or descriptors may be provided by a variety of data formats. Means for storing segment data comprise, for example, a text or flat file, an xml document, and/or fields and tables in a database. There are many design choices that are available in drafting of the specifications' guidelines and data formats, and the corresponding application and data query routines. For example, the date for a sixty minute presentation need not be more than a text file or xml data providing a list of segment definitions. For example: 00:01:20:17, 00:02:41:14; 00:05:15:21, 00:05:37:08; 00:05:55:06, 00:06:12:03. In a preferred embodiment, a video map comprises such tables, fields, indexes, and relational relationships to suit particular data, retrieval, performance, and playback objectives.

In a preferred embodiment, the mapping of a video implements an assembly methodology where the creation of a map for each of the features or functions is created by one or more of different group of specialist mappers and quality control personnel. Advantageously, the eleven feature sets are created by fifteen departments. The fifteen departments and their primary feature supported are: SIX and PRE (Presentations); COM (Compilation); SUB (Subjects); DIL (Dilemma); BES and CHA (Best Of and Performers); ADS (Shopping); MUS (Music); ITE, ITM, CLI, and SCE (Search); OBJ (Control); and PRE (Preview). In addition, video and other information is obtained by support and other specialized departments and included in a video map. Each department creates its own specialized video map which is then merged into a transport map as a particular embodiment requires. The transport map is made available to the user application which them merges the transport into a user map database.

Mapping of a video need not be the product of one or more mappers or departments within an organization. The various individual or focused maps of a movie may be created by a community supported methodology. Enhancing the richness of the mapping of segment while retaining a consistent and efficient coding may be accomplished by managing the contributions by a community supported methodology. The advantage of a community supported methodology is the potential to maximize the number movies for which, for example, a presentation is created. In a community supported methodology, a user with specific expertise in a motion picture may contribute a presentation. This contribution may be internally reviewed by a mapper or quality control supervisor, and/or be externally reviewed by the user community. Adherence to the requirements of the specification and data formats promotes the effectiveness of the architecture. The online encyclopedia "Wikipedia" provides an example of one of a number of community supported methodologies that serve as a production model. User contribution may be encouraged by the dynamics of an economic model. Additionally or alternatively, a user contribution may be encouraged and directly compensated by, for example, monetary payments, or indirectly compensated by, for example, the issuance of video content access minute credits in proportion to the value of the amount of the contribution.

Figure 6:
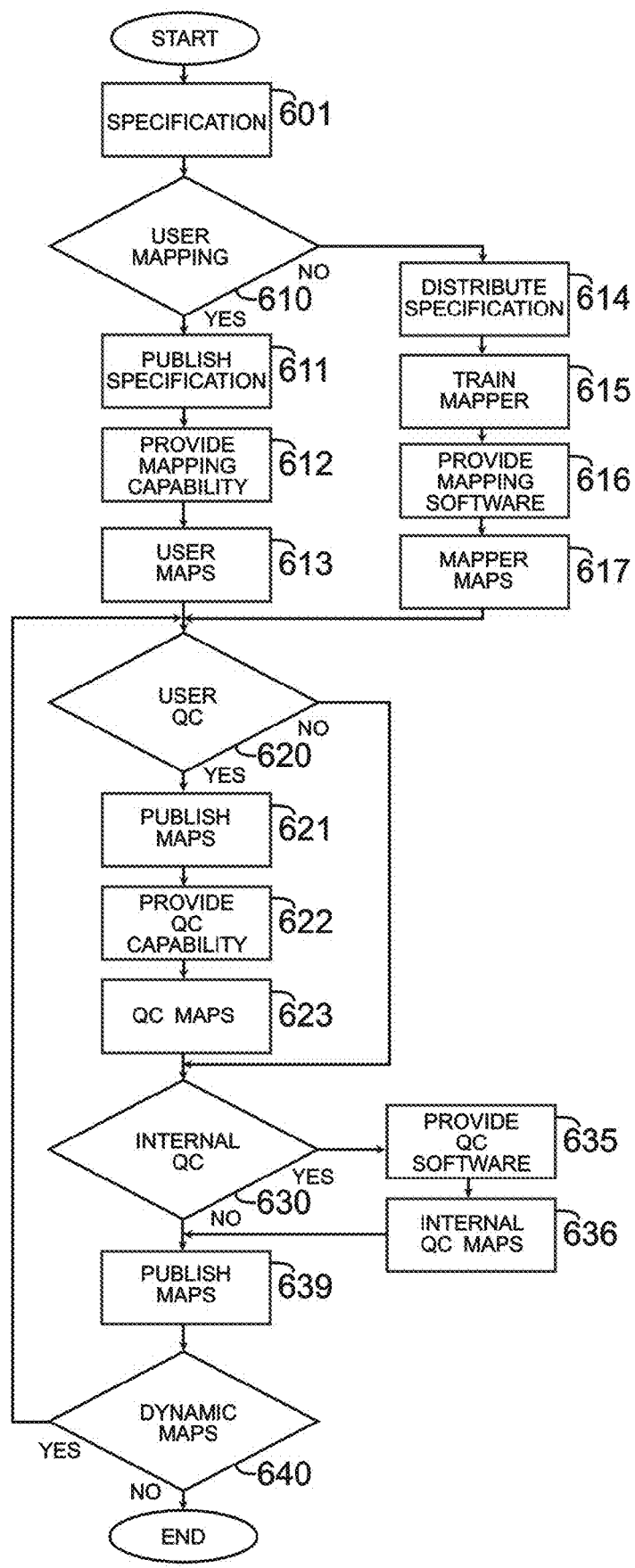
FIG. 6 is a flow chart of a method for creating a video map for one or more feature sets and playback functions.

FIG. 6 is a flow chart of method for creating a video map for one or more feature sets and playback functions. In those embodiments, where a map creation process comprises the use of specifications, a video map production methodology comprises steps of drafting a specification 601 and publishing the specification externally 611, and/or distributing the specification internally 614. If a user collaborative methodology is implemented 610 alone or in combination with other methodologies, then it is advantageous to publicly publish the specifications 611. Alternatively, no specification is provided, and the user collaborative methodology is left to directly or indirectly develop its own specifications. Alternatively, in cooperation with such collaborative methodology, exemplary video maps may be published to serve as the specification to enable the community to proceed with video map production.

In a collaborative implementation, the user community may be provided with mapping capability, e.g., software, 612 that facilitates the drafting of maps by users 613. Alternatively, or in cooperative combination with such collaborative methodology, e.g., trained mappers 615 which have specialized mapping software 616, can create video maps 617. If neither the users 620 nor an internal staff performs quality control ("QC") 630, then the video maps produced by either the users 613 or the mappers 617 are published to end users 639 for use. If, as in other collaborative methodologies, users here also provide quality control 620, then work product of the users and/or the mappers, as appropriate is published 621 for purposes of quality control.

Users are provided with quality control capability 622 that enables them to provide quality control for video maps 623. Alternatively, or in cooperative combination with such collaborative methodology 630, mappers perform, with the aid of quality control training, software, and systems 635, an independent or dependent quality control of the video maps 636. Video maps that have undergone quality control at the external user level 623 or at the internal mapper level 636 are in due course published 639 for use by the end users. Published video maps 639 need not remain static, instead, advantageously, video maps after they are published, and while substantially completed, are viewed as work in progress 640. This would enable the end users and/or mappers to enhance video maps over time.

Notwithstanding the particular disclosure with respect to FIG. 6, a particular video map production embodiment need not produce all of the definitions and descriptors required to support all of the features and functions detailed herein or incorporated herein by reference, and a video map need not be responsive to any specification and/or data format. As described above, a video map need only consist of information directly or indirectly identifying a beginning and ending of one or more segments, one or more video frames, one or more descriptors, or one or more linkages that may be necessary to support a single feature or function. Thus, in certain embodiments, the steps of drafting a specification 601 and publishing the specifications 611, among other steps, may be omitted. In those instances where an individual feature or function map is created, it may be merged into a map that combines all the various feature and function maps. Further, a particular set of steps of the video map production methodology may be used for one feature, e.g., the 60 Minutes presentation, and a different set of steps of the video map production methodology may be used for a different feature (e.g., the Compilation feature) or function (e.g., the Where? Function).

A video map may be provided in a variety of data formats, including, for example, a text or flat file, an xml document, and/or fields and tables in a database. The data format example that follow illustrate, by way of example, that there are many design choices that are available in drafting of the specifications' guidelines and data formats, and the corresponding processing software and data query routines. For example, with respect to a Who function embodiment, a "string" data format may require that: (i) the first letter in each word in a name of a performer or character is capitalized; (ii) a period (".") connects the first name to the last name; (iii) an equal symbol ("=") separates and establishes the relationship between a Performer's name and a character's name; (iv) the performer's name precede the character's name; (v) a bracket ("[ ]") separates a performer's, and/or a character's name from other keywords; (vi) the bracket precedes and follows the performer's/character's name; and (vii) the performer's and character's name precede any additional terms or keywords that may be included in the string. For example, in a scene of the motion picture "Matrix Reloaded", the characters Morpheus and Commander Lock are speaking about the character Neo being "the One." The string data format would look as follows:

[Lawrence.Fishburn=Morpheus]
[Harry.J.Lennix=Commander.Lock]Neo.

In this example, since Neo is not depicted in the clip, the clip would only provide "Lawrence Fishburn as Morpheus" and "Harry J. Lennix as Commander Lock" to a Who function. A text file embodiment limited to performer/character identification information may, for example, comprise the following elements:

```
CHA20="Carrie Ann Moss as Trinity" PIC=20557
CHA45= "Matt McColm as Agent.Thompson" PIC=35257
Segment 92, 01:52:20:17, 01:52:41:14, CHA20, CHA45
```

An xml embodiment limited to performer/character identification information may, for example, comprise the following elements:

```
< Segment>
    <SegID>92</SegID >
    <SegBegTime>01:52:20:17</SegBegTime>
    <SegEndTime>01:52:41:14</SegEndTime>
    <SegCharacter>20</SegCharacter>
    <SegCharacter>45</SegCharacter>
</ Segment>
<Character>
    <ChaID>20</ChaID>
    <ChaName>Trinity</ChaName>
    <Pername>Carrie Ann Moss</ChaName>
    <ChaPic>20557</ChaPic>
</Character>
<Character>
    <ChaID>45</ChaID>
    <ChaName>Agent Thompson</ChaName>
    <Pername>Matt McColm</ChaName>
    <ChaPic>35257</ChaPic>
</Character>
```

The data formats that are implemented in the text file enable software routines to extract from the text file illustration the same information that may be provided by the xml illustration. Similarly, a database embodiment limited to performer/character identification information may, for example, comprise the following database table, and fields (data types):

```
Segments
    SegID (AutoNumber)
    SegBegTime (Number)
    SegEndTime (Number)
    ChaID (Number)
    ChaFirst (Alpha)
    ChaMiddle (Alpha)
    ChaLast (Alpha)
    ChaPic (Number)
    PerID (Number)
    PerFirst (Alpha)
    PerMiddle (Alpha)
    PerLast (Alpha)
```

Notwithstanding the simplicity of the illustrative database embodiment, in a preferred embodiment a video map, responsive to the specific presentation feature and/or playback function, comprises such tables, fields, indexes, and relational relationships to suit particular data and retrieval performance objectives. The point is that the data supporting a feature and/or function is not dependent on any particular data format, organization, transport, and/or storage methodology or architecture.

Further, a video map may also include such information as may be required to accommodate DVD-Videos, and the like, that include multiple versions of a video. For example, a DVD-Video for the motion picture "Ted" offers the theatrical released version (Title 1 with a length of 1 hour and 46 minutes) and an unrated version (Title 2 with a length of 1 hour and 52 minutes). Although not required, a single map or multiple maps may provide data for each of the versions. In those instances, the necessary navigation data is retrieved from the video and/or the map and the user is provided the option to indicate a version preference for one or the other version and in some instances both versions (e.g., keyword Search feature). In the case of Ted, since the unrated version provides more explicit content than the theatrical release, and given the content customization capabilities of the Control feature, the map only addresses the unrated version. In those instances in which a variable content video provides materially alternative content, then a single map or multiple maps would advantageously provide the information for each of the versions, and the user would be presented the version options to indicate a version preference.

Multimedia Player

Preferred embodiments of the various inventive elements disclosed herein utilize a player comprising synergistically integrated random access and communications capabilities. The player comprises the various functions, capabilities and components of a variety of consumer electronic systems including, for example, an optical player and a gaming system, e.g., Sony PlayStation 3; a video recorder, e.g., 300-hr TiVo® Series3™ HD Digital Media Recorder; a set-top box capable of retrieving video-on-demand services from a remote video services provider, e.g., a Scientific Atlanta Explorer 8000; a multimedia computing device, e.g., a desktop computer with, for example, a 16× DVD drive; and a full-featured editing system, e.g., Avid Xpress Pro. The teachings of such devices are incorporated herein by reference.

A player permits a user to obtain videos, multimedia, and other services from storage means within the player, sources locally accessible, and/or from a remote services provider. Additionally, the player, as per the various inventions detailed herein, comprises the means and operational methods of, for example, (i) customizing a playing of a motion picture stored in an optical readable disc; (ii) time shifting and customizing the playing of a motion picture obtained from, for example, a DBS transmission; (iii) integrating communications (e.g. phone answering) with a playing (e.g. auto-replay) of a motion picture; and (iv) auto-configuring a host player.

Figure 7:
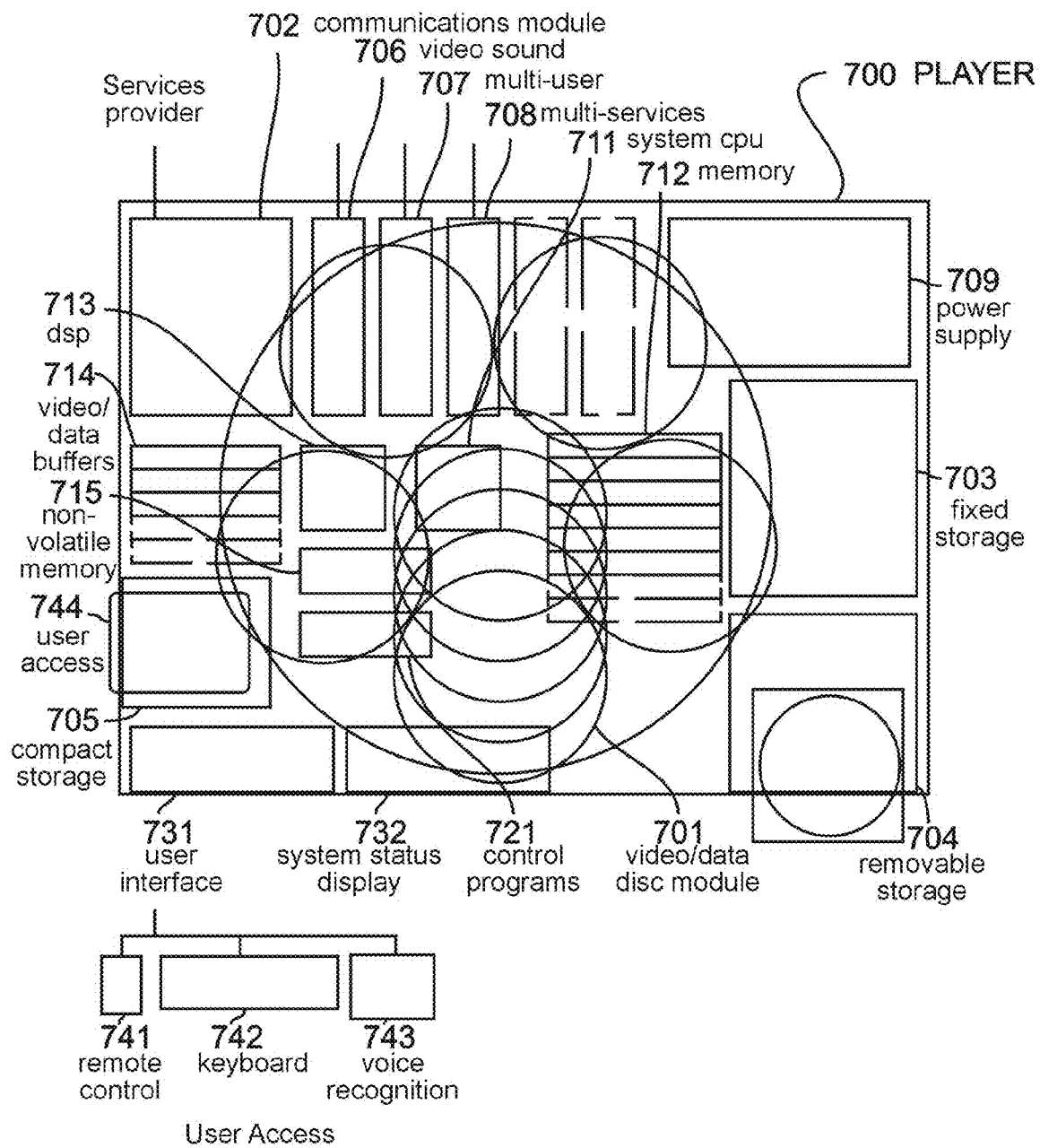
FIG. 7 is a schematic diagram of a multi-featured player.

FIG. 7 is a schematic diagram of a multi-featured player 700 comprising the following primary modules and subsystems: i) random access video/data disc module (e.g. a multi-disc optical read/write drive) 701; ii) communications module 702; iii) fixed storage subsystem 703; iv) removable storage subsystem 704; v) compact portable storage subsystem 705; vi) external video/audio input/output support module 706; vii) multi-user modules 707; and viii) multi-services modules 708.

The communications module 702 may be as simple as a modem card or device, or as sophisticated as may be required by a direct fiber optic access to a remote video and communication services provider. The communications module may support a plurality and variety of wired and wireless connections to access a variety of networks. Additionally, the communications module may support a plurality of competing broadcasts and on-demand video delivery systems. In this fashion by merely depressing the appropriate keys in a remote control device a user can easily switch between off the air transmissions and on-line services. By this method a video services provider can satisfy a wide range of video requirements without necessarily utilizing video-on-demand system capacity. In such instances a player may be connected to a local receiving means. The receiving means may be, for example, an indoor antenna, an outdoor antenna, an existing system, such as the electrical system, that may serve as an antenna, or a local media server.

The fixed memory subsystem 703 refers to any nonvolatile memory storage device principally utilized to randomly read/write and store significant quantities of information. An example of a fixed memory storage subsystem is a personal computer's hard disk drive (HDD) and a solid-state drive (SDD).

The removable memory subsystem 704 refers to any non-volatile memory storage device principally utilized to transport information to and from two similarly equipped devices. Examples of removable memory storage subsystems are electronic memories and removable hard disks. Electronic memories comprise, for example, USB flash drives. The random access disc module 701 is another example of a removable storage subsystem.

The compact portable storage subsystem 705 and user access media 744 is principally distinguished from a removable storage subsystem 704 by the size of the media and the greater variety of memory storage technologies that are generally implemented. Nonetheless, some of the removable storage media, such as for example a flash drive, are also considered user access media 744. Examples of other removable storage media and user access media are: laser read/write cards, in which at least one surface of the card permits a laser to read/write information; electronic cards, in which the information is stored in electronic components; magnetic cards and drives embodying magnetic storage technology, electronic memories and cartridges.

Clearly, a variety of memory devices are available utilizing technologies and combinations of technologies to suit particular performance requirements. The above classifications of the memory devices are directed at bringing attention to functional capabilities of a player rather than to a particular technology. The classifications are not intended to restrict a subsystem to a particular classification, limit the selection of subsystems which may be implemented, or to limit the function of the particular subsystem implemented.

It is intended that a full featured player additionally "play" a variety of laser readable media, such as, Blu-rays, DVDs, CDs, photo CDs, and interactive videos and games, in a conventional manner. The wide range of video/data discs that may be accommodated and the various configurations are diagrammatically emphasized in FIG. 7 as the five stacked circles and the five circles inside the representation of the video/data disc unit 701.

The external video/audio input/output support module 706 supports video/audio/data transmission to the primary video display system comprising, for example, a monitor/television, stereo system, and keyboard/voice recognition-response. Additionally, the input/output module supports video/audio input from local sources such as for example video cameras, and videophones. The construction of the external support module follows the conventional practices of consumer electronic products as for example: optical disc players, recorders, and personal computers.

Multi-user modules 707 principally support separate controlled independent access by other users of the player's processing, video, and communications resources. The construction of multi-user modules following established networking technologies.

In a preferred embodiment, instead of utilizing one of the Windows operating systems, the player will incorporate a small footprint multi-user multitasking real-time operating system with a streamlined user interface patterned after, for example, the simpler interface of a cable receiver. A multilayer approach to the functionality/complexity of such functions as surfing the net; contact management and email, optical disc/internet hybrid games, applications and services; video editing; multimedia and word processing; and portfolio management and banking, are made available at a streamlined level that provides functionality required by most users at a markedly reduced level of complexity.

Multi-services modules 708 provide a host of services, such as for example residential security, and appliance operation management. The operation of the module being principally a software application running under the multi-user operating system implemented. The construction of the particular multi-service module is responsive to the particular application.

The player further comprises computing elements and video processing elements readily found in multimedia devices and video electronic systems such as, for example, and not limitation, microprocessor 711, memory units 712, video processor or digital signal processor 713, video, audio, and data buffers 714, and nonvolatile memory 715. The video audio module or board 706 and the video processor 713 comprise compression-decompression technologies to both retrieve and decompress videos and compress and transmit videos. The compression technologies may include hardware, firmware, software, or any combination of these. One or a plurality of existing and forthcoming video compression methods may be implemented such as: Motion-JPEG, MPEG 1, MPEG 2, Fractals, Wavelets, and MPEG 4.

A player's control programs that manage the player's resources, and the retrieval and processing of data and video information, reside in dedicated chips 721. Alternatively, or additionally, control programs are stored in mass memory devices 703 from installed or downloaded software, in removable memory media 704, or in a user access media 744.

A player's user control interface 731 includes communications to the buttons and keys located on the cabinet of the device, and to the associated control devices 741-742-743. The keys, buttons, and switches, conventionally found in consumer electronic systems and deemed advantageous to the operation of the player may also be implemented. These controls are further augmented by a plurality of function comprising: segment skipping control, magnification controls, content preferences control, video map control, and system menu control. The user control interface 731 additionally supports infrared and/or RF remote control units 741, e.g., numeric control pad, keyboard with a touchpad, and game controller; wire connected control units 742, e.g., cable connected computer keyboard, mouse, and game controller; a voice recognition unit 743; and touch-screen capability. A remote control 741 may also include any device, such as a smartphone or pad, that may be synergistically integrated to support functions and features disclosed and/or incorporated herein by reference.

The keyboard, similar to a personal computer implementation, facilitates system setup, keyword retrieval, and system functions requiring the entry of alpha characters. Since a preferred configuration of a player comprises significant multimedia capabilities, a keyboard pointing means is advantageous. A keyboard connector used to connect a standard AT keyboard or a dedicated keyboard is supplied. Alternatively, an infrared-based or radio-based keyboard is implemented. Further, given the computing and storage capabilities of the player, a voice response subsystem option accommodating at least the few commands, such as play, stop, mute, audio, skip, required to control the basic operations can additionally be provided. The sophistication of the voice recognition capability can be enhanced as the hardware/software configuration of the player advances within mass market price points.

Implemented in the player is a digital system status display subsystem 732, which provides visual feedback and system status information similar to the implementations in video playback devices.

In general, parts, subassemblies, and components of a player are of conventional characteristics and are freely substituted by like functioning elements and components. For example, and not limitation, while fiber optic-based communications are preferred, copper phone lines and coaxial cable-based communications are considered less capable functional equivalents. Additionally, a certain degree of redundancy of components is illustrated in FIG. 7 to schematically show and detail significant functions.

Clearly, redundant components, in general, and redundant electronic components, in particular, are intended to be eliminated in a preferred embodiment. For example, while a player may include a removable memory subsystem and a compact memory subsystem, one may be the functional equivalent of the other, and one or the other may be eliminated. In general, where cost effective, components are designed to serve a combination of functions.

Further, the configuration of the player's various modules, components, and subsystems, are intended to offer flexibility analogous to that found in a personal computer. Specifically with respect to the multi-user capabilities, a player may be configured, for example, with more than one optical module, whether inside the primary cabinet or in a mating or sister cabinet. Various embodiments of players do not include all, or even most, of the means, and/or capabilities detailed herein. The particular configuration of a player is responsive to the particular functions or features desired.

Responsive to user friendliness, a more advanced wireless plug and play communications and power motherboard and cabinet design is preferred. The motherboard and cabinet would permit the replacement of, for example, the power supply 709 just as easily as a battery is replaced in a portable personal computer. In a preferred embodiment of a player, every component and subsystem is added or replaced without resorting to screwdrivers and the need to unplug and plug communications and power cables.

Generally, in, for example, an optical disc implementation, the entire variable content video (video/audio and video map) is provided in a format similar to that required by the video images contained in the disc. Specifically, in a DVD implementation, the video map is included in a digital format and the video content is included in a digital compressed format in one or more spiral tracks. A video map may be provided with, or separate from, the video's video and audio data. For example, a DVD may comprise, as part of its manufacturing, a prerecorded video and a corresponding video map whether separate from video frames or interleaved among video frames. Clearly, the playing of a DVD is not technically limited to the manner prescribed by the widely accepted DVD specifications.

Alternatively, the video map and other data may be separately provided by a removable memory media, user access media, or downloaded by means of the communications interface. For example, a player simply configured and comprising, a DVD drive and a flash drive or modem provides editing and retrieval benefits for DVDs storing a conventional linear video. Additionally, the drive may serve to store a user's generalized or video specific video content preferences. Conventional linear video programs provide a library of motion pictures to which the teachings herein may be applied.

In those instances where the authoring of the video did not include the production of a video map, the map may be retrieved from a source, e.g., a web site, other than the source of the video, e.g. an optical drive or a remote video provider. In this embodiment, a video map, user interface and other control programs particular to the motion picture may be downloaded by the internet from a remote map server or other player. Upon a playing of a video, the control program causes the reading of the video's identifier from the video source 701, searches the mass memory fixed storage device 703 for a video map and if not available communicates with an external source to download the appropriate map.

With respect to control programs, scheduling routines, user preferences, video map, and other principally software elements, it is noted that these may be separately or jointly stored in any one of a player's various firmware/hardware memory devices. For example, the user's content preferences are stored in nonvolatile resident memory 715, in the memory of the fixed or removable memory subsystem 703/704, a user's optical read/write access card or electronic memory card 744, or from the respective read/write video/data disc 701. In an interactive video game application, data, in general, and game software, in particular, for example, may be downloaded to the hard disk, reserving subsequent access of the optical disc for video/audio retrieval. A player's processing of the control programs 721 is principally a function of the system CPU 711 and system RAM 712.

Networks

A video, segment information, play routines specific to the video, and control codes for automatically configuring or controlling the functions of the player may be provided by means of a variety of existing and evolving technologies. In addition to the hard formats such as tape, optical disc, optical/magnetic disk, memory chips and modules (e.g. RAM, DRAM, high capacity flash memory, bubble memory); a video may be provided by soft formats that may be implemented in a variety of communications networks utilizing for example analog or digital cable transmissions, fiber optic transmission, phone and satellite communications. A player need not be physically accessible by a user or be physically located near a display device or a television set. The player may provide a user access to remote video resources and may itself be remotely controlled by the user. Fiber optic and coaxial communications easily permit the required transfer rates over long distances between controllers, players, other video sources and displays.

It is within a network-based implementation, that the various advantages and capabilities of the preferred embodiments are realized with respect to the specific hardware technologies and architectures of an underlying video delivery system.

Figure 8:
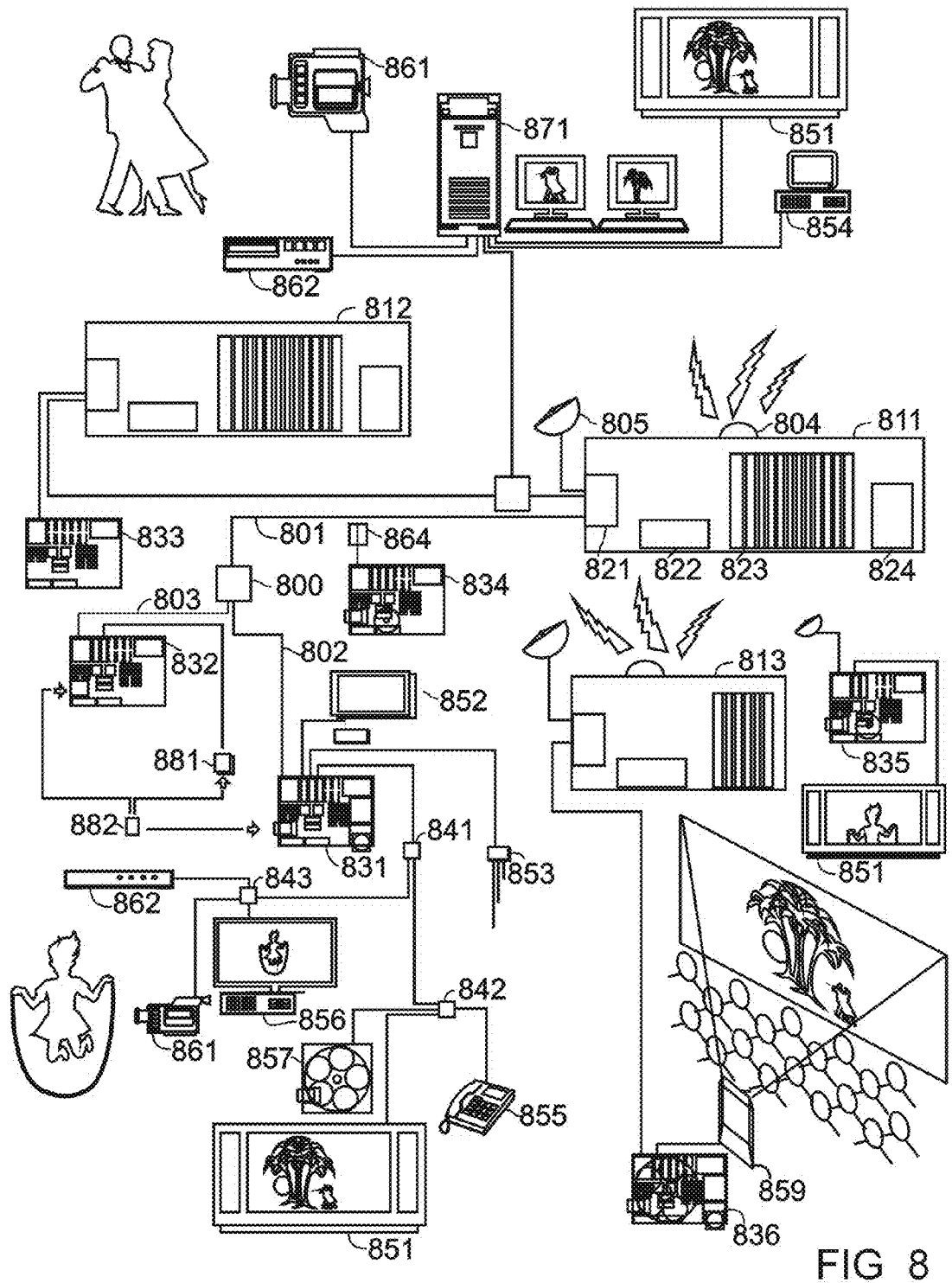
FIG. 8 is a schematic diagram of a video provider and end user network architecture.

FIG. 8 is a schematic diagram of a video provider and end user network architecture in which participants in the network 800 comprise any number of video providers 811-813, and any number of end users 831-836. Participants in the network 800, however, whether classified as video providers 811-813 or end users 831-836 are both providers and end users of video services. Analogous to a communications network, each participant is able to retrieve and transmit video/data from any other participant. An example is the "YouTube" free online video streaming service that allows users to view and share videos that have been uploaded by other users.

A video-on-demand system, in general, a content-on-demand system, the delivery of variable content video services, and the delivery of video maps in particular, are herein intended to be deployable by a variety of possible networks and player configurations. FIG. 8 suggests a plurality of network infrastructures that may be implemented. Shown are wired and non-wired video transmission infrastructures based on, for example, the use of one or a hybrid combination of the following: fiber optic 801, coaxial cable 802, twisted copper wire 803, microwave, radio WIFI, or Bluetooth 804, and satellite 805.

Each participant in the network obtains a hardware configuration consistent with their desire and objectives, and their financial resources. The video system of a participant who wishes to serve as a video provider 811-813 is functionally equivalent to the player previously detailed with respect to FIG. 7, differing only in that the respective resources are appropriately scaled and modified to simultaneously access a variety of videos, and service a number of end users. Both an end user's player 831 and a nonlinear editing system 871 are in fact video servers. A video server of a video services provider is distinguished principally by the significantly greater video storage capacity and the number of video streams it can service.

A video provider system, for example 811, comprises: i) communications technologies 821 for establishing a plurality of video and communications streams to a plurality of players 831-836 to enable the uploading and/or downloading of information, data and/or video content, such as segments and videos; ii) processing hardware and software 822 for retrieving from a player an end user's video preferences, content preferences, search terms and search requests, and for processing the user's video preferences, content preferences, search terms and search requests. e.g., performing searches of segment data to identify the segments or list of segments responsive to a users search terms and search requests; iii) mass storage random access memory devices 823 for storing and retrieving video maps (e.g., segment data), and/or a videobase comprising a plurality of any combination of video segments, motion pictures, conventional programs, interactive games and services, and variable content videos; and iv) processing hardware and software 824 for maintaining accounting and support services in connection with video services provided.

Simply stated, a variable content video provider system 811-813 comprises a video server and the video server software being enhanced to deliver variable content video services.

Video providers may be further categorized according to the functions served and/or the extent and character of the data and videobase maintained. Central video services providers 811 may be capable of providing a greater variety of video services than for example regional or local services providers 813. Regional or local services providers 813, however may be the source of local interest video services such as are currently broadcast by local television stations. Other video services providers 812 may act as "libraries" for specialized categories of videos, as for example an historical video archive of government proceedings; or services as for example electronics shopping. The internet architecture and the different classes of web sites are suggestive of the wide range of multimedia configurations that are possible.

A user's access to the resources of a video services provider 811-813 need not be direct. A requested video may be downloaded, in real time or non-real-time, to a services provider that may be more economically accessible to the intended user. Within the network, some video services provider may not directly provide any services to users, but act as centralized video originators or depositories for other services providers.

The video server's mass storage random access memory devices 823 for storing a plurality of variable content videos may advantageously implement a multiple-read/write head architecture. This would also facilitate the simultaneous retrieval of several versions of a video from a single video source to satisfy simultaneously the particular viewing requirements of several end users. A multiple-read-head architecture reduces, for example, the number of copies of a video that the on-line video server may need to store.

In this context it is also noted that the mass storage devices may additionally implement stripping methods to store a video across several storage devices. Where cost effective, a variable content video may be entirely or partially stored in RAM.

The particular configuration of a player's random access, storage, memory, processing, and communication means and capabilities are responsive to, but are not necessarily limited by, the minimum requirements of, for example, a particular service provider. A player configuration, such as detailed with respect to FIG. 7, provides the required video accessing and storage, processing, and communications architecture required by a network-based remote video services provider.

The player's multi-user and multi-services modules support separate controlled independent access by a plurality of users of the player's processing, video, and communications resources. In addition to the primary video display system 851 supported by a player 831, the multi-user module and multi-services module installed also provides services to a monitor/keyboard 852, security system 853, personal multimedia computer 856, voice and/or video/voice telephones 855. In this fashion a player acts an intermediate services provider.

The particular location of the player, subsystems, or components, whether within the immediate boundaries of a residence, automobile, or the particular location of the end user, are not limited herein to any particular arrangement. A variety of configurations are possible to meet the various needs at any particular time of the end user. In a preferred embodiment a player is similar in size and weigh to a super thin portable notebook computer. This permits a user to have available all of the functions herein detailed irrespective of the user's particular location at any moment in time.

In commercial applications, such as a theater, a player 836 may support a high definition projector 859. For illustration purposes, connections between players and output devices are shown with lines. However, communications may be established by any of a variety of wired or wireless means. Thus, a player 731 need not be directly or indirectly connected by wire to the devices 851-859, 861-862. Further, devices 851-859, 861-862 may be connected to a communications port 841-843 which is in communications with the player 831. The communications port may be of varying degrees of intelligence and capabilities, it may serve to boost or manage the signal, or have no other purpose than to serve as a convenient outlet in which to plug and unplug devices.

In an embodiment as shown in FIG. 8, a location will be "wired" or "networked" to enable a self configuring player to identify and establish a communications with other devices in the network. Additionally, player modules may themselves be physically distributed over the network. The plug and play of modules across a network architecture permits, for example, that the video disc module be physically remote from a player's 831 main unit and plugged on a port 842 near the television 851. In this instance, the case 857 housing the video disc module also houses a compact storage module. Thus, a single video disc module can be easily moved from one location 842 to another location 843 when physical proximity is required to conveniently replace discs. It is noted that while the disc module case 857 is connected to a first port 842, it would be remotely accessible to a terminal 856 plugged into a second port 843.

FIG. 8 also shows, for example, the use of a separate compact portable storage subsystem 881 and a user access media 882 to physically transport user data, video map, and/or video between players 831-832.

A player's core components may be located anywhere inside or outside the location. Specially, where a player includes fans and disk drives, the top of the TV set would not be an ideal location.

As detailed previously, the user's control of a player is either through an infrared control keypad, wired or infrared alphanumeric control keyboard, voice control, or system controls directly on the player. These controls may be directly incorporated in the devices accessing the player such as a TV.

The novel combination of an external fiber optic based communications module and a multiple read/write storage module, provides a player configuration capable of efficiently downloading significant amounts of full motion video to be viewed, played with, or processed at the end user's leisure. In such a player, the downloading of, for example, a feature length motion picture, an interactive video game, or a series of lectures can be achieved with unprecedented speed.

As suggested earlier, an object of FIG. 8 is to convey the concept that an end user's player 831-836 and an editing system 871 can both upload and download video and video maps through the network directly to other end users 831-836, editing systems 871, and/or to the video servers of videos services providers 811-813.

A player may be configured to duplicate the functions of a nonlinear editing system as previously detailed. Both the player 831 and the editing system 871 are capable of receiving input from other sources such as a digital video camera 861 and digital video recorder 862 (e.g., TiVo Premiere XL4 DVR). As is the case with player 831, the editing system 871 is capable of outputting video to, for example, a TV 851 and to a PC 854.

As indicated previously, a player can accommodate a plurality of compression and decompression technologies to both retrieve and decompress videos and compress and transmit videos through the network. Preferably, a specific video originating at a digital camera 861, downloaded to a nonlinear editing system 871, transmitted over the network 800 to a video server for retransmission over the network 800 to a player 831 will utilize a single compression technology to avoid compounding the effects of artifacts that may be introduced by a particular compression technology. Clearly, where the decompression technology resides completely in software, the video itself could provide the required decompression software.

As indicated above, variable content video services can be delivered by means of any of a number of non-wired based video delivery systems. For example, microwave technologies may provide two way video services including movies-on-demand. The network uses a series of transmitters 804, each of which is capable of broadcasting a digital signal. End users utilize an antenna 864 to receive the signal. The antenna 864 is connected to a decoder connected to a TV set. In an embodiment, a player 834 performs the processing and decoding functions required for transmission to a video display.

In a preferred embodiment of a cellular-like system, a video provider's cell site 813 comprises microwave communications, video server, and processing systems for establishing a plurality of video and communications streams to a plurality of players 831-836.

Video Provider

A player's capability to download videos from a remote video provider permits an end user to efficiently obtain, from an extensive videobase, a video(s), segment(s) of a video, and/or segment(s) from each of a plurality of videos, to be viewed at the time of the user's choosing, over which the user exercises complete control as to the subject matter, form of expression, and other elements comprising the video. Further, the resulting video need not comprise or result from a single videobase. A video may result from the automated selection of a variety of segments/videos from one or a plurality of videobases.

Figure 9:
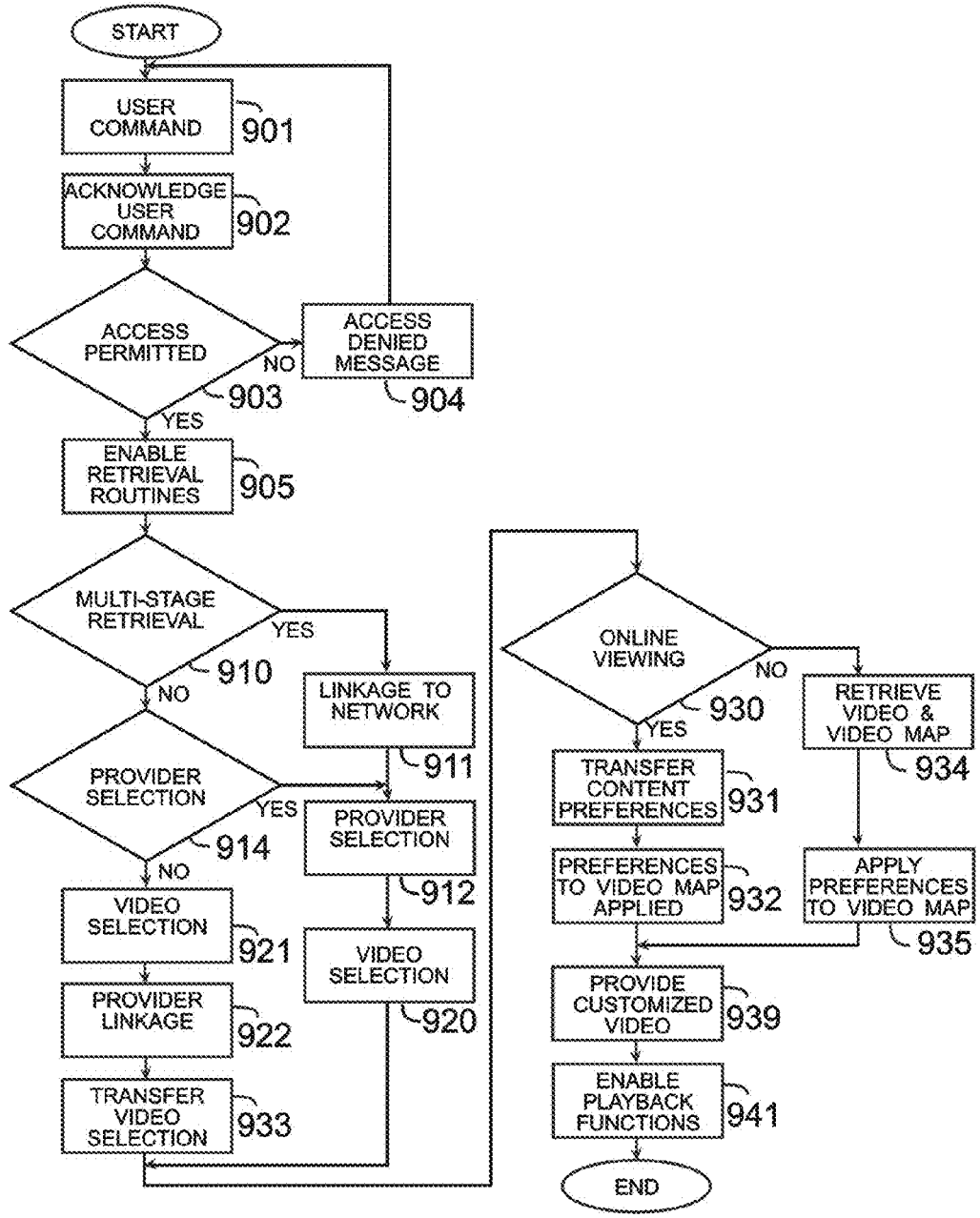
FIG. 9 is a flow chart of a method for variably playing a video obtained from a remote video provider.

FIG. 9 is a flow chart detailing a method of variably playing a video obtained from a remote video provider. It is noted that handshaking and other routines are flexible and user configurable and a number of permutations and variations of what is detailed are possible. In operation, a player normally provides a variety of communication and background services and, therefore, is ready to respond to an user command 901. Upon receipt of a user command, the player provides power to a display unit (TV) if necessary, and transmits an appropriate acknowledgment 902. Access routines are enabled to determine if a user's access is permitted 903. In a preferred embodiment, these routines reside within the player and are executed prior to establishing a communications linkage with either a network administrator or directly with a video services provider. If access is denied 903, an error message 904 is provided to the display and the player is returned to the state prior to the user active request. Delay routines may be implemented to provide the user the opportunity to attempt to obtain access without a player going to "sleep".

If access is permitted 903, retrieval routines are enabled 905 to permit the remote retrieval of a video. It is noted that in the case of the video dial-tone model, there may be a multi-stage retrieval routine 910 when the user first establishes communications with the network administrator 911, for example a cable or telephone company, then selects a particular video services provider 912, and then request the desired video 920. Alternatively, retrieval routines 914 permit a direct selection of a video services provider 912. Video selection 920 then proceeds on-line with the selected video provider. A video services provider can be pre-established. In that case, the user would skip having to select a services provider immediately prior to a video request. Further, a user may establish relationships with specific video providers for specified services. Still further, the video selection process 921 may determine with which provider a communications linkage is automatically established 922. The result of the video selection process is automatically transferred 923 to the appropriate provider upon the establishment of a communications linkage. Clearly, the selection of a video services provider is not required in those instances where a user obtains all the services from a single provider. It is noted that other combinations are possible and that retrieval routines may reside within a player to further minimize the on-line time, or be provided on-line at different points in the communications than shown here. The video selection process may implement any one or more routines that are suggested by the examples herein provided.

Once a video is selected, if the user remains on-line during the viewing of the video 930, the user's content preferences are communicated to the video provider 931. The video provider server then applies the user's preferences to the map of the selected video 932 and provides the resulting seamless and continuous presentation of the video that is consistent with the user's preferences 939. In this case the user remains on-line during the viewing of the presentation 939, but has access to video viewing control functions including the playback functions 941 as if the video was directly available to the player.

Alternatively, the entire video, including all the parallel, overlapping, and transitional segments of multiple versions, the video map, and seek/step data if necessary, are retrieved from the video provider 934. Once downloaded, the player applies the user's preferences to the map of the selected video 935 and provides a presentation of the video that is consistent with the user's preferences 939. In this case the user has direct access to the player's video viewing control functions including the playback functions 941. Whether only the resulting presentation(s) of the video is downloaded, or the entire video, including the video map and seek/step data if necessary, the user may interact with the video to the degree that the user desires. If player is off-line and the interaction requires additional video and/or data from the video services provider to, for example, support the playback functions, the player automatically reestablishes communications with the appropriate video services provider and brings the video server up to speed. That is, the player automatically provides the required information to enable the video server to comply with the user's requirements or requests.

In those instances where multiple versions of a video, the video map, and seek/step data if necessary, is downloaded, the player need not store all of the segments, and if all of the segments are stored, they need not all be stored for more than a transitory period, i.e., the time for a user to erase the undesired content. A video map provides the information to omit the initial storage or to erase, the storage of content of the video. This would be of particular benefit for, for example, a parent downloading an "R" motion picture, and after viewing it, causing the erasure of those segments which are inconsistent with a "PG" version. Or for example, a user causing, for example, only a Romance version, or the results of keyword searches to be saved. A significant advantage of the partial erasure of content is that storage capacity is freed for a subsequent use. In such instances, the original video maps may be retained; or only the relevant data of the video map may be retained separately and/or incorporated within a master video map. Any data and content that may be downloaded in response to a playback function request may be retained for future use. Similarly, the seek/step data may be synchronized to the remaining content by deletion, adjustment, and/or cross-reference.

The teachings disclosed herein, directly and indirectly by, for example, incorporation, are intended to show a variety of architectures, services, capabilities, systems, methods, and inventive elements which are combined and may be combined to suit particular embodiments. The synergies among and between the various inventive elements is a significant feature of the disclosures herein. The various examples included herein demonstrate that it is intended, and deemed advantageous, that each of the methods detailed herein benefit from the teachings presented with other methods detailed herein and/or incorporated by reference. Further, it is the intent of incorporation to derive the full benefits, as an addition or an alternative, of the logical integration of the teachings herein with the teachings of the references cited. The incorporation by reference at a specific place within the specification is not intended to limit the extent to which the reference is incorporated, or the manner in which it may be integrated. Where a teaching may be deemed to be at cross purposes, or otherwise incompatible, with some other teaching, it ought to be understood as a possible alternative to be utilized as a particular preferred embodiment may require. Clearly, it may be neither advantageous nor practical for all the elements or a particular combination of elements to be implemented in a single embodiment.

While elements of the inventions have been detailed in conjunction with specific embodiments thereof, it is evident that many alternatives, modifications and variations are possible and will be apparent to those skilled in the art in light of the foregoing description. For example, while the detailed disclosure references DVD-Videos and a DVD Navigator; the inventions are not limited to an optical disc format or any other type of video format, or to the specific capabilities of a navigator. Accordingly, it is intended to embrace all such alternatives, modifications, variations, and combinations as fall within the spirit and broad scope of the specification. The teachings that have been cited and incorporated herein are offered by way of example, and not limitation, of the underlying foundation of knowledge and skill that is available. Many of the features, components, and methods found in the art may be incorporated, as suggested herein, in a preferred embodiment; and since other modifications and changes varied to fit particular requirements and environments will be apparent to those skilled in the art, the inventions are not limited to the embodiments set forth or suggested herein. It is to be understood that the inventions are not limited thereby. It is also to be understood that the specific details shown are merely illustrative, and that the inventions may be carried out in other ways without departing from the broad spirit and scope of the specification.

What is claimed is:

1. A method comprising the steps of:
   retrieving video information comprising (a) a plurality of segment definitions defining video segments within a video, the defining being responsive to intellectual aspects within the video; and (b) a plurality of video frame identifiers comprising at least one video frame identifier being associated with an intellectual insight;
   enabling a user to establish a presentation preference and a function preference;
   playing, responsive to the presentation preference and the plurality of segment definitions, selected video segments from within the video as a storyline driven video presentation that is focused on the intellectual aspects within the video and that is less in length than the length of the video;
   monitoring a play location within the video presentation;
   searching the plurality of video frame identifiers to identify a video frame identifier that is responsive to the play location and the function preference;
   providing, during the playing of the storyline driven video presentation that is focused on the intellectual aspects and that is less in length than the length of the video, and responsive to the identified video frame identifier, an indication that an intellectual insight is available;
   receiving, from the user, a request that is responsive to the indication; and
   providing, responsive to the request, the intellectual insight.

2. The method of claim 1 wherein the at least one video frame identifier is further associated with additional information that is responsive to an intellectual aspect; and wherein the method further comprises the steps of:
   receiving from the user a request for additional information; and
   providing the additional information that is responsive to the intellectual aspect.

3. The method of claim 1 wherein at least one of the segment definitions is further associated with descriptors that are responsive to an intellectual aspect; and wherein the method further comprises the steps of:
   keyword searching the plurality of segment definitions; and
   selectively playing, responsive to the keyword searching, a compilation of video segments.

4. The method of claim 1 further comprising the steps of:
   receiving, from the user, a request for additional information that is responsive to an intellectual aspect; and
   playing, responsive to user request and from within the video presentation, a compilation of video segments that are responsive to the intellectual aspect.

5. The method of claim 1 wherein the intellectual insight provides an explanation of a thematic idea depicted within the video presentation.

6. The method of claim 1 wherein the intellectual insight comprises an identification of a clue depicted within the video presentation.

7. A method comprising the steps of:
   retrieving video information comprising (a) a plurality of segment definitions defining video segments within a video, the defining being responsive to intellectual aspects within the video; and (b) a plurality of video frame identifiers comprising at least one video frame identifier being associated with an intellectual insight;
   enabling a user to establish a presentation preference and a function preference;
   playing, responsive to the presentation preference and the plurality of segment definitions, selected video segments from within the video as a storyline driven video presentation that is focused on the intellectual aspects within the video and that is less in length than the length of the video;
   monitoring a play location within the video presentation;
   searching the plurality of video frame identifiers to identify a video frame identifier that is responsive to the play location and the function preference; and
   providing, during the playing of the storyline driven video presentation that is focused on the intellectual aspects and that is less in length than the length of the video, and responsive to the identified video frame identifier, an intellectual insight.

8. The method of claim 7 wherein the at least one video frame identifier is further associated with additional information that is responsive to an intellectual aspect; and wherein the method further comprises the steps of:
   receiving from the user a request for additional information; and
   providing the additional information that is responsive to the intellectual.

9. The method of claim 7 wherein at least one of the segment definitions is further associated with descriptors that are responsive to an intellectual aspect; and wherein the method further comprises the steps of:
   keyword searching the plurality of segment definitions; and
   selectively playing, responsive to the keyword searching, a compilation of video segments.

10. The method of claim 7 further comprising the steps of:
    receiving, from the user, a request for additional information that is responsive to an intellectual aspect; and playing, responsive to user request and from within the video presentation, a compilation of video segments that are responsive to the intellectual aspect.

11. The method of claim 7 wherein the intellectual insight comprises an identification of a clue depicted within the video presentation.

12. The method of claim 7 wherein intellectual insight provides an explanation of a thematic idea depicted within the video presentation.

13. The method of claim 7 wherein the intellectual insight comprises an explanation of an intellectual aspect.

14. A method comprising the steps of:
retrieving video information comprising (a) a plurality of segment definitions defining video segments within a video, the defining being responsive to intellectual aspects within the video; and (b) a plurality of video frame identifiers comprising at least one video frame identifier being associated with an intellectual insight;
enabling a user to establish a presentation preference and a function preference;
playing, responsive to the presentation preference and the plurality of segment definitions, selected video segments from within the video as a storyline driven video presentation that is focused on the intellectual aspects within the video and that is less in length than the length of the video; and
providing, during the playing of the storyline driven video presentation that is focused on the intellectual aspects and that is less in length than the length of the video, and responsive to the function preference and a selected video frame identifier, an intellectual insight.

15. The method of claim 14 wherein the at least one video frame identifier is further associated with additional information that is responsive to an intellectual aspect; and wherein the method further comprises the steps of:
receiving from the user a request for additional information; and
providing the additional information that is responsive to the intellectual aspect.

16. The method of claim 14 wherein at least one of the segment definitions is further associated with descriptors that are responsive to an intellectual aspect; and
wherein the method further comprises the steps of:
keyword searching the plurality of segment definitions; and
selectively playing, responsive to the keyword searching, a compilation of video segments.

17. The method of claim 14 further comprising the steps of:
receiving, from the user, a request for additional information that is responsive to an intellectual aspect; and
playing, responsive to user request and from within the video presentation, a compilation of video segments that are responsive to the intellectual aspect.

18. The method of claim 14 wherein the intellectual insight comprises an explanation of an intellectual aspect.

19. The method of claim 14 wherein the intellectual insight provides an explanation of a thematic idea depicted within the video presentation.

20. The method of claim 14 wherein the intellectual insight comprises an identification of a clue depicted within the video presentation.

* * * * *